US012684610B2

(12) United States Patent
Liu et al.

(10) Patent No.: US 12,684,610 B2
(45) Date of Patent: Jul. 14, 2026

(54) METHOD PERFORMED BY NETWORK NODE AND NETWORK NODE

(71) Applicant: Samsung Electronics Co., Ltd., Suwon-si (KR)

(72) Inventors: Haiyi Liu, Beijing (CN); Huiyang Wang, Beijing (CN); Xiaohui Liang, Beijing (CN); Jing Yuan, Beijing (CN); Yi Zhao, Beijing (CN); Xiangning Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 18/312,293

(22) Filed: May 4, 2023

(65) Prior Publication Data

US 2024/0205958 A1     Jun. 20, 2024

Related U.S. Application Data

(63) Continuation of application No. PCT/KR2023/004953, filed on Apr. 12, 2023.

(30) Foreign Application Priority Data

Dec. 14, 2022     (CN) ......................... 202211610793.X

(51) Int. Cl.
*H04W 72/56*          (2023.01)
*H04B 17/345*        (2015.01)
*H04W 72/541*        (2023.01)
(52) U.S. Cl.
CPC .......... *H04W 72/56* (2023.01); *H04B 17/345* (2015.01); *H04W 72/541* (2023.01)

(58) Field of Classification Search
CPC ... H04W 72/56; H04W 72/541; H04B 17/345
See application file for complete search history.

(56) References Cited

U.S. PATENT DOCUMENTS

| 8,036,674 B2 | 10/2011 | Yim et al. |
| 8,605,685 B2 | 12/2013 | Song et al. |
| (Continued) | | |

FOREIGN PATENT DOCUMENTS

| AU | 2009210527 A1 * | 8/2009 | .......... H04W 72/541 |
| AU | 2014266127 A1 * | 9/2015 | .......... H04L 5/0073 |
| (Continued) | | | |

OTHER PUBLICATIONS

International Search Report dated Aug. 31, 2023, issued in International Patent Application No. PCT/KR2023/004953.
(Continued)

*Primary Examiner* — Saad A. Waqas
(74) *Attorney, Agent, or Firm* — Jefferson IP Law, LLP

(57) ABSTRACT

A method performed by a network node and a network node is provided. The method includes obtaining interference information for a current cell, the interference information for indicating interference levels at time units of a next period in each interference measurement area of a plurality of interference measurement areas of the current cell, obtaining scheduling priorities of user equipments (UEs) at the time units of the next period according to the interference information and locations of the UEs in the current cell, and performing a scheduling of the UEs in the current cell according to the scheduling priorities.

19 Claims, 30 Drawing Sheets

| Pattern Number | TS0 | TS1 | TS2 | |
|---|---|---|---|---|
| Pattern 0 | 1 | -1 | 0 | |
| Pattern 1 | 1 | 0 | -1 | |
| ... | ... | ... | ... | |
| Pattern 5 | -1 | 0 | 1 | |
| Pattern Number | TS0 | TS1 | TS2 | TS3 |
| Pattern 0 | 1 | -1 | 0 | 0 |
| Pattern 1 | 1 | 0 | -1 | 0 |
| ... | ... | ... | ... | ... |
| Pattern 14 | 1 | -1 | -1 | 1 |
| Pattern 15 | -1 | 1 | -1 | 1 |
| Pattern 16 | -1 | 1 | 1 | 1 |
| Pattern 17 | -1 | -1 | 1 | 1 |

| | TS0 | TS1 | TS2 | TS3 |
|---|---|---|---|---|
| Cell 0 | Time unit with low interference -100dBm | Time unit with high interference -85dBm | Time unit with low interference -110dBm | Time unit with high interference -90dBm |
| Cell 1 | | | | |
| Cell 2 | | | | |
| ⋮ | | | | |
| Cell G | | | | |

(56) References Cited

U.S. PATENT DOCUMENTS

| | | | |
|---|---|---|---|
| 8,717,914 B2 | 5/2014 | Kim et al. | |
| 8,761,779 B2 | 6/2014 | Dimou et al. | |
| 11,139,913 B2 | 10/2021 | Chendamarai Kannan et al. | |
| 12,028,893 B2 | 7/2024 | Ju et al. | |
| 12,169,888 B2 | 12/2024 | Hu et al. | |
| 2016/0119917 A1 | 4/2016 | Yang et al. | |
| 2021/0227403 A1 * | 7/2021 | Tsui | H04W 24/02 |
| 2021/0410161 A1 | 12/2021 | Wang et al. | |
| 2022/0116795 A1 * | 4/2022 | Abedini | H04W 24/02 |
| 2023/0189315 A1 * | 6/2023 | Haustein | H04W 24/02 |
| | | | 370/252 |

FOREIGN PATENT DOCUMENTS

| | | | | |
|---|---|---|---|---|
| CA | 2874867 A1 * | 12/2013 | | H04W 72/542 |
| CN | 103621171 A | 3/2014 | | |
| CN | 109495913 A | 3/2019 | | |
| CN | 107872890 B * | 11/2020 | | H04W 72/56 |
| CN | 115175380 A * | 10/2022 | | H04B 1/7097 |
| JP | 3655169 B2 * | 6/2005 | | H01Q 3/2605 |
| KR | 10-2022-0051634 A | 4/2022 | | |
| TW | 201108843 A * | 3/2011 | | H04W 72/542 |
| WO | WO-2014089822 A1 * | 6/2014 | | H04B 7/0452 |
| WO | WO-2016029132 A1 * | 2/2016 | | H04W 72/542 |
| WO | WO-2023276196 A1 * | 1/2023 | | H04W 72/541 |

OTHER PUBLICATIONS

TCL Communication, Discussions on Sub-Use Cases in AI/ML for CSI Feedback Enhancement, 3GPP TSG RAN WG1 #111, R1-2211509, Nov. 7, 2022, Toulouse, France.

China Telecom, Discussion on AI/ML for CSI feedback enhancement, 3GPP TSG RAN WG1 Meeting #111, R1-2211526, Nov. 7, 2022, Toulouse, France.

ZTE, Discussion on other aspects for AI CSI feedback enhancement, 3GPP TSG RAN WG1 Meeting #111, R1-2211058, Nov. 7, 2022, Toulouse, France.

* cited by examiner

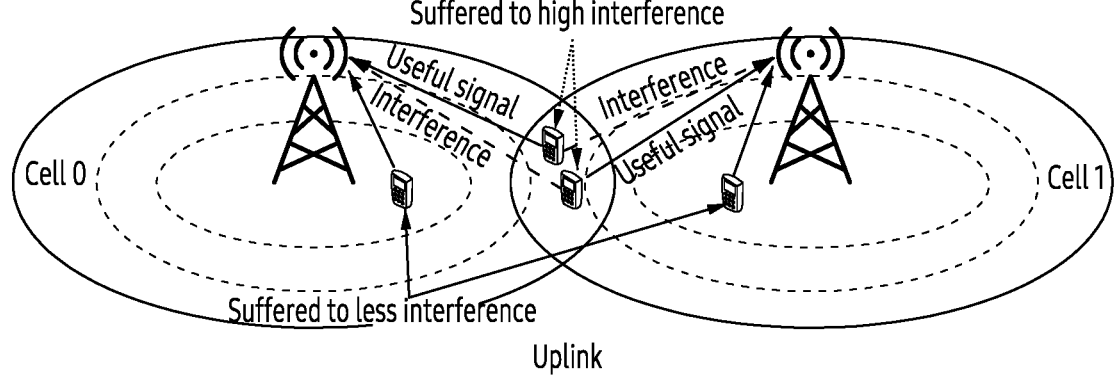
Uplink
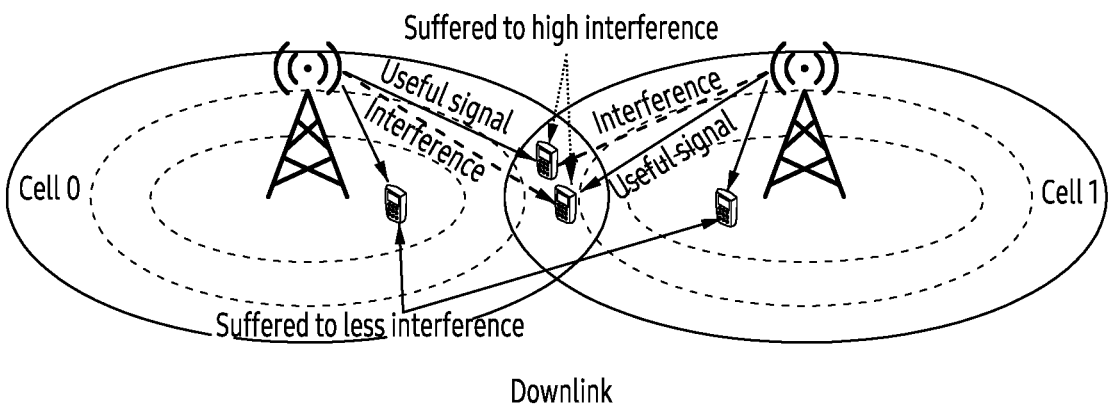
Downlink
FIG. 1

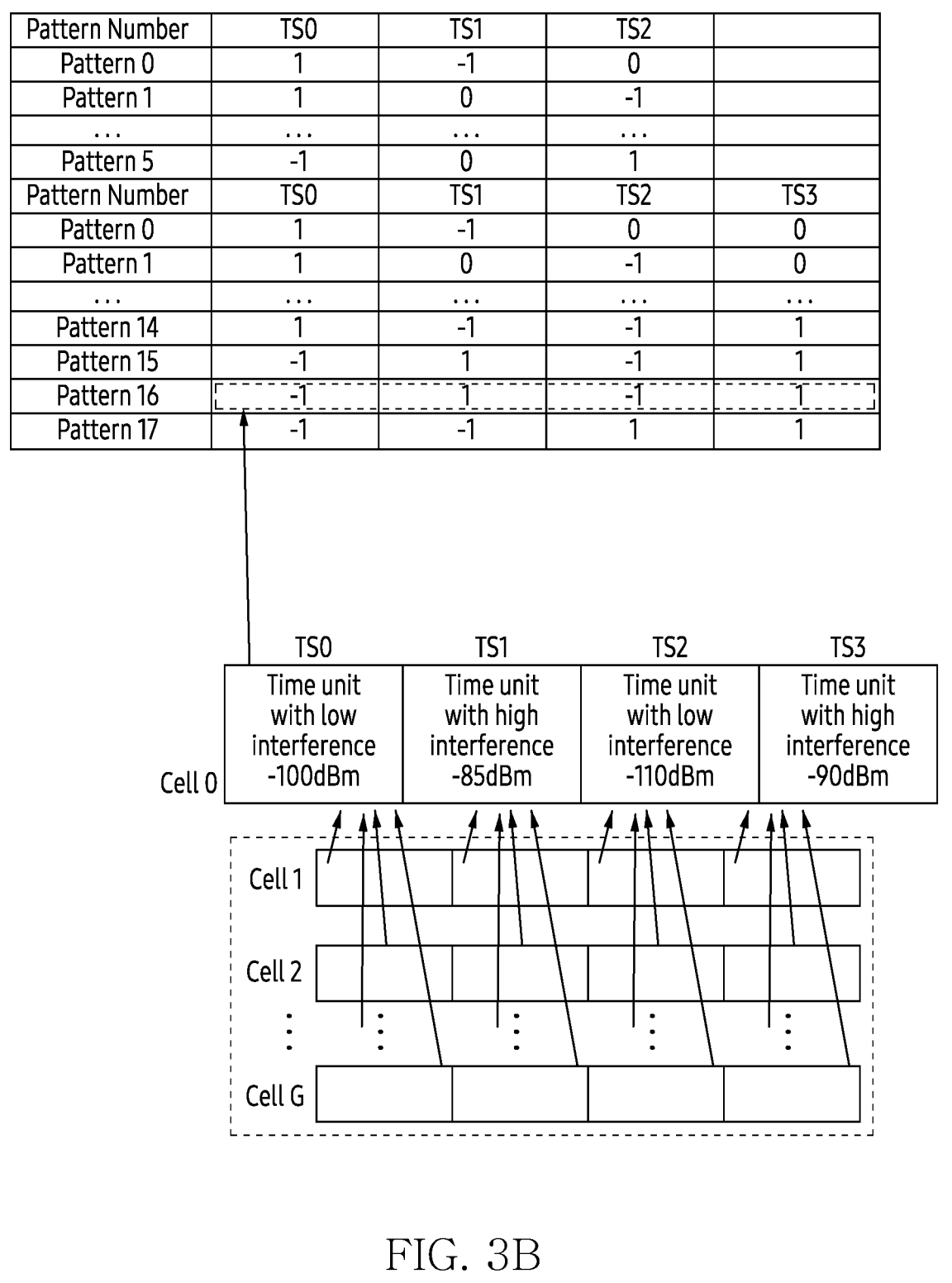

| Pattern Number | TS0 | TS1 | TS2 | |
|---|---|---|---|---|
| Pattern 0 | 1 | -1 | 0 | |
| Pattern 1 | 1 | 0 | -1 | |
| . . . | . . . | . . . | . . . | |
| Pattern 5 | -1 | 0 | 1 | |
| Pattern Number | TS0 | TS1 | TS2 | TS3 |
| Pattern 0 | 1 | -1 | 0 | 0 |
| Pattern 1 | 1 | 0 | -1 | 0 |
| . . . | . . . | . . . | . . . | . . . |
| Pattern 14 | 1 | -1 | -1 | 1 |
| Pattern 15 | -1 | 1 | -1 | 1 |
| Pattern 16 | -1 | 1 | -1 | 1 |
| Pattern 17 | -1 | -1 | 1 | 1 |

|  | TS0 | TS1 | TS2 | TS3 |
|---|---|---|---|---|
| Cell 0 | Time unit with low interference -100dBm | Time unit with high interference -85dBm | Time unit with low interference -110dBm | Time unit with high interference -90dBm |

Cell 1

Cell 2

Cell G

FIG. 3B

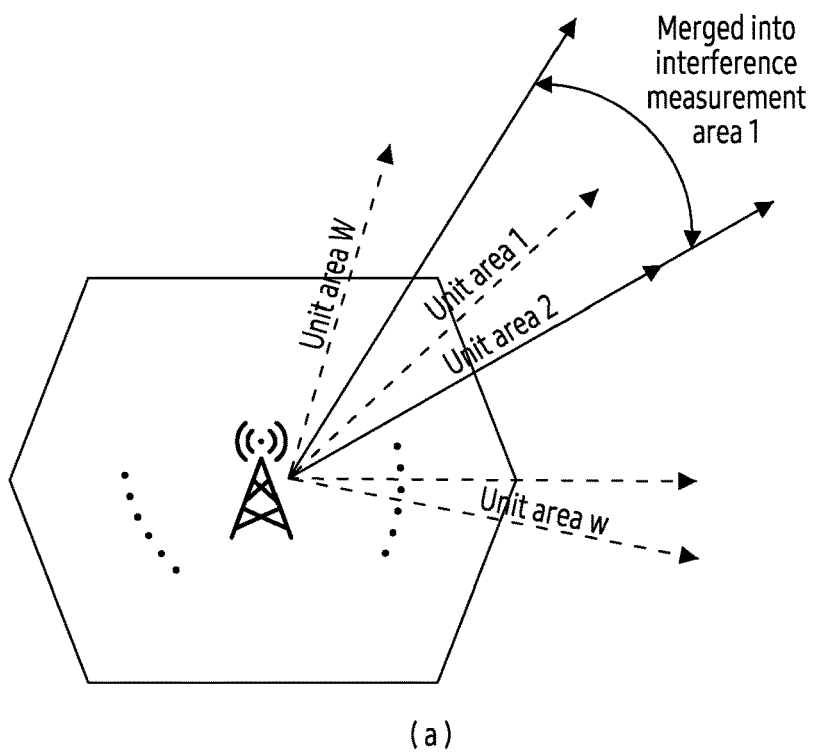
(a)
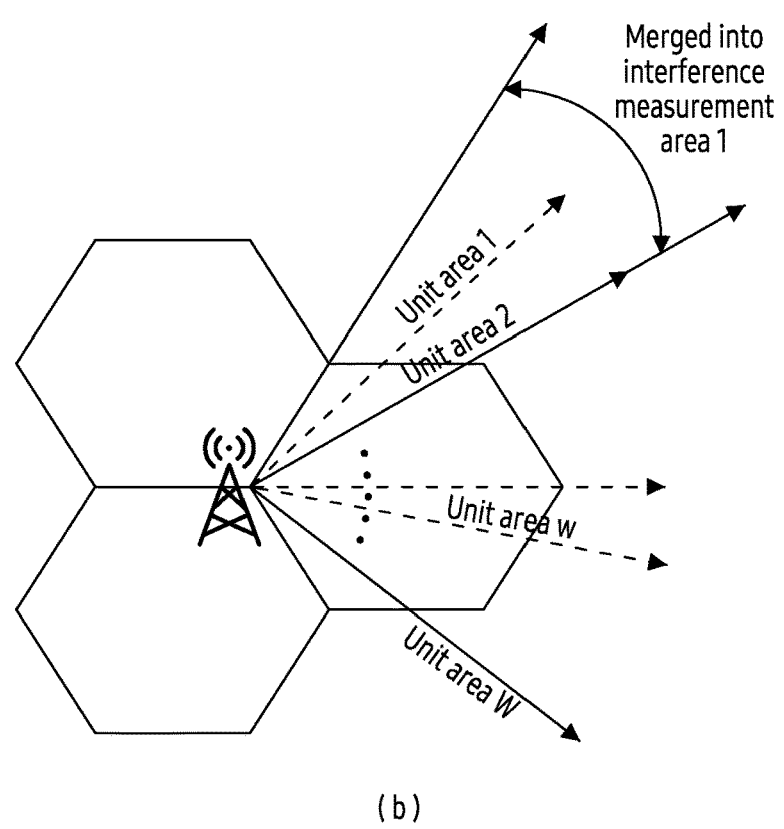
(b)
FIG. 5

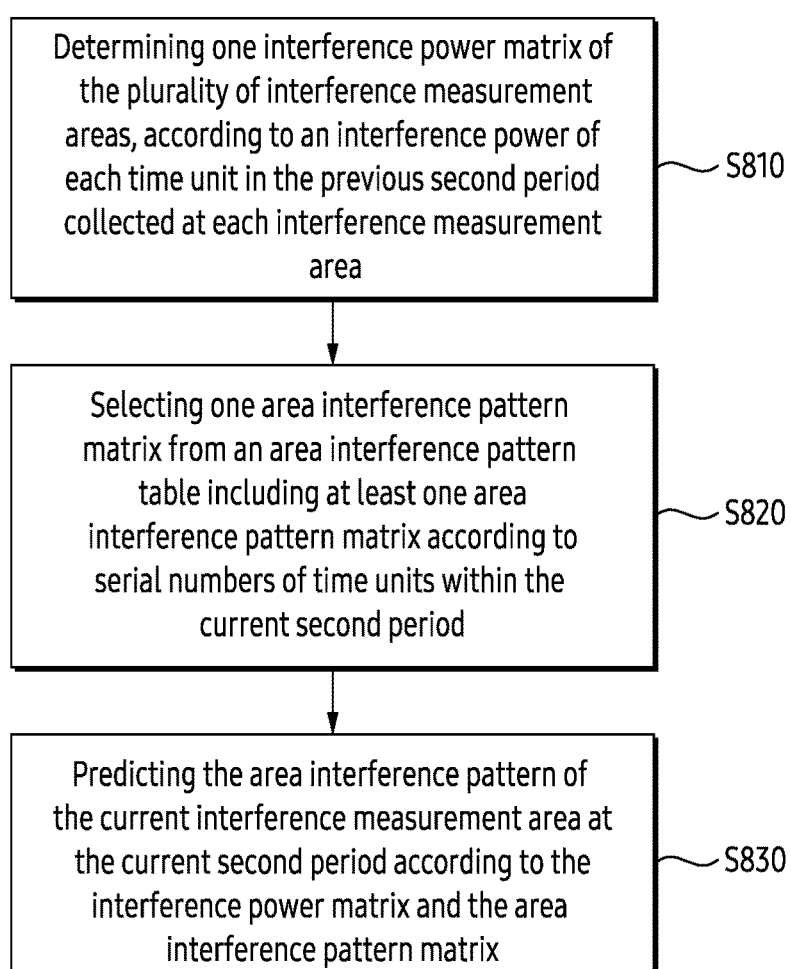

Determining one interference power matrix of the plurality of interference measurement areas, according to an interference power of each time unit in the previous second period collected at each interference measurement area — S810

Selecting one area interference pattern matrix from an area interference pattern table including at least one area interference pattern matrix according to serial numbers of time units within the current second period — S820

Predicting the area interference pattern of the current interference measurement area at the current second period according to the interference power matrix and the area interference pattern matrix — S830

FIG. 8

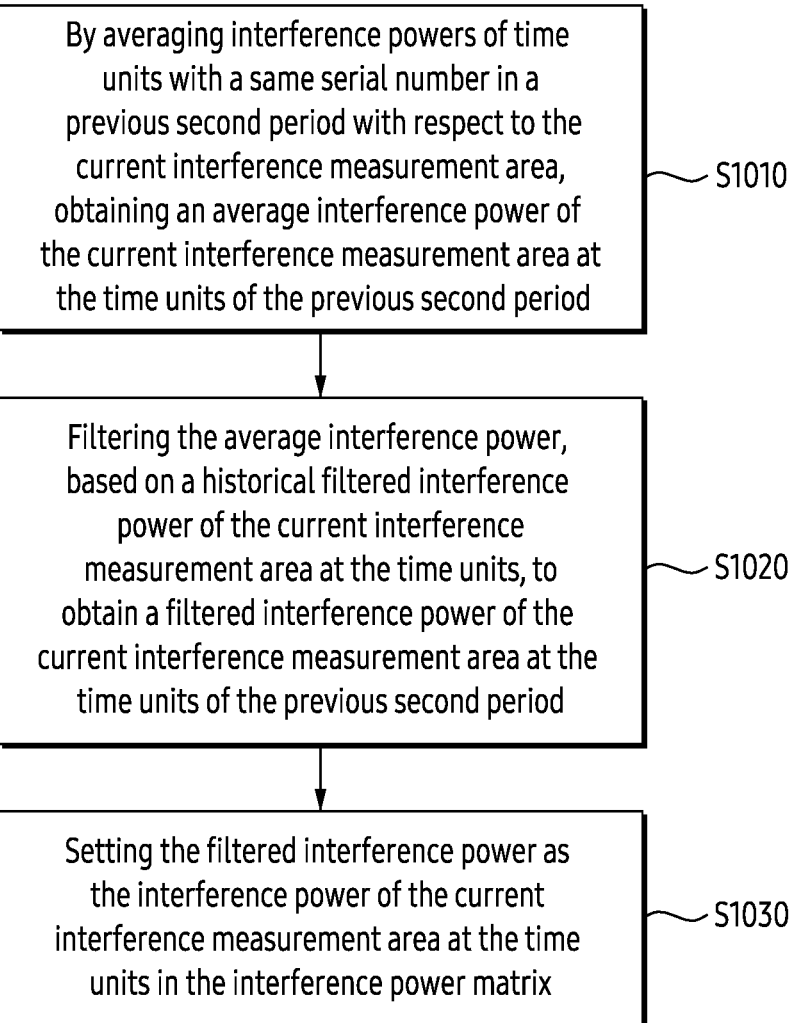

By averaging interference powers of time units with a same serial number in a previous second period with respect to the current interference measurement area, obtaining an average interference power of the current interference measurement area at the time units of the previous second period ⟶ S1010

Filtering the average interference power, based on a historical filtered interference power of the current interference measurement area at the time units, to obtain a filtered interference power of the current interference measurement area at the time units of the previous second period ⟶ S1020

Setting the filtered interference power as the interference power of the current interference measurement area at the time units in the interference power matrix ⟶ S1030

FIG. 10

CMatrix1

| Pattern Number | TS0 | TS1 | TS2 | |
|---|---|---|---|---|
| Pattern 0 | 1 | -1 | 0 | |
| Pattern 1 | 1 | 0 | -1 | |
| . . . | . . . | . . . | . . . | |
| Pattern 5 | -1 | 0 | 1 | |

| Pattern Number | TS0 | TS1 | TS2 | TS3 |  |
|---|---|---|---|---|---|
| Pattern 0 | 1 | -1 | 0 | 0 | -20 |
| Pattern 1 | 1 | 0 | -1 | 0 | 10 |
| . . . | . . . | . . . | . . . | . . . | . . . |
| Pattern 14 | 1 | -1 | -1 | 1 | 0 |
| Pattern 15 | -1 | 1 | -1 | 1 | 0 |
| Pattern 16 | -1 | 1 | -1 | 1 | 40 |
| Pattern 17 | -1 | -1 | 1 | 1 | -20 |

CMatrix2                1110

FIG. 11

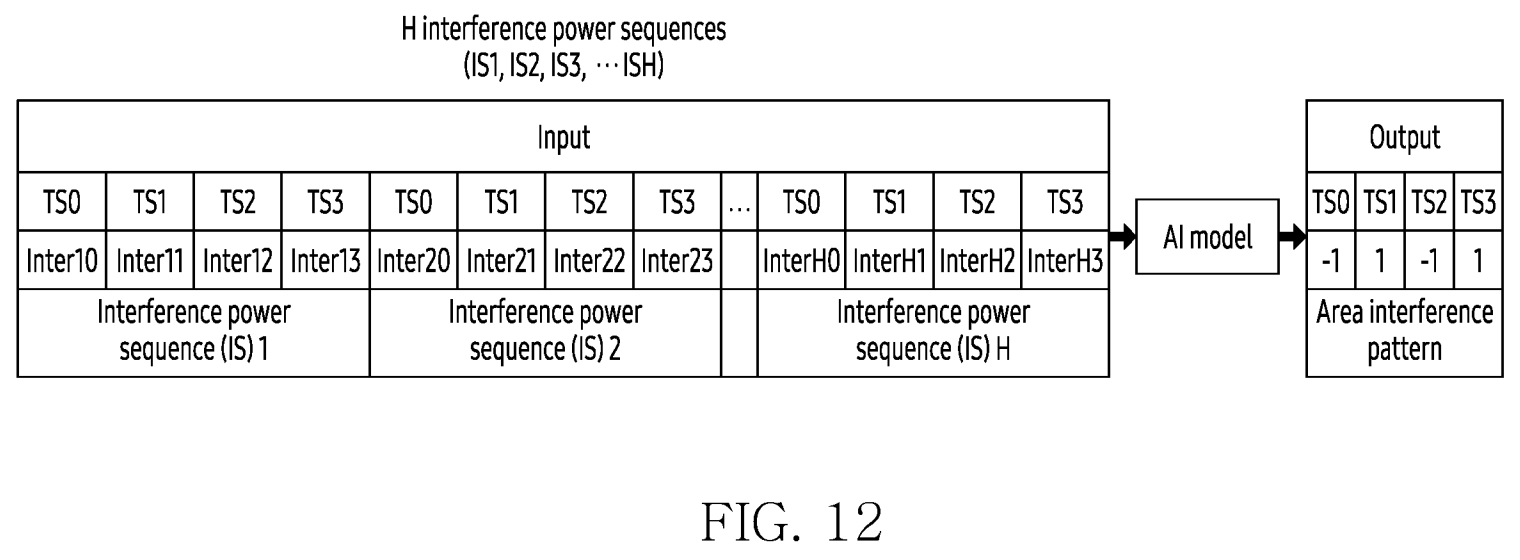

H interference power sequences
(IS1, IS2, IS3, ···ISH)

| Input | | | | | | | | | | |
|---|---|---|---|---|---|---|---|---|---|---|
| TS0 | TS1 | TS2 | TS3 | TS0 | TS1 | TS2 | TS3 | ... | TS0 | TS1 | TS2 | TS3 |
| Inter10 | Inter11 | Inter12 | Inter13 | Inter20 | Inter21 | Inter22 | Inter23 | | InterH0 | InterH1 | InterH2 | InterH3 |
| Interference power sequence (IS) 1 | | | | Interference power sequence (IS) 2 | | | | | Interference power sequence (IS) H | | | |

| Output | | | |
|---|---|---|---|
| TS0 | TS1 | TS2 | TS3 |
| -1 | 1 | -1 | 1 |
| Area interference pattern | | | |

AI model

FIG. 12

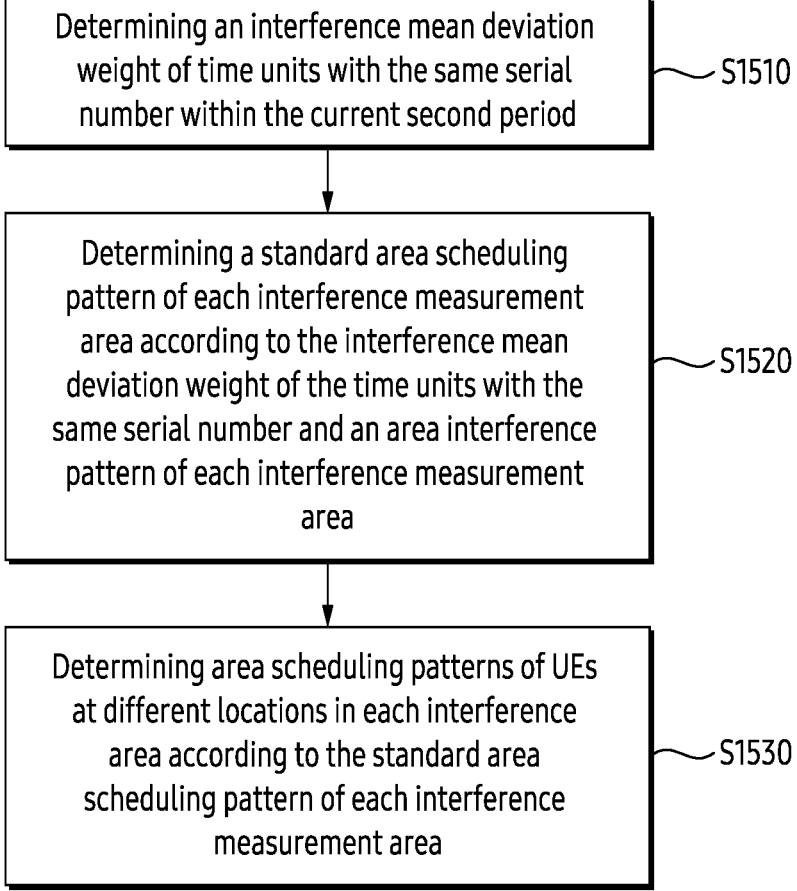

Determining an interference mean deviation weight of time units with the same serial number within the current second period ⟶ S1510

Determining a standard area scheduling pattern of each interference measurement area according to the interference mean deviation weight of the time units with the same serial number and an area interference pattern of each interference measurement area ⟶ S1520

Determining area scheduling patterns of UEs at different locations in each interference area according to the standard area scheduling pattern of each interference measurement area ⟶ S1530

FIG. 15

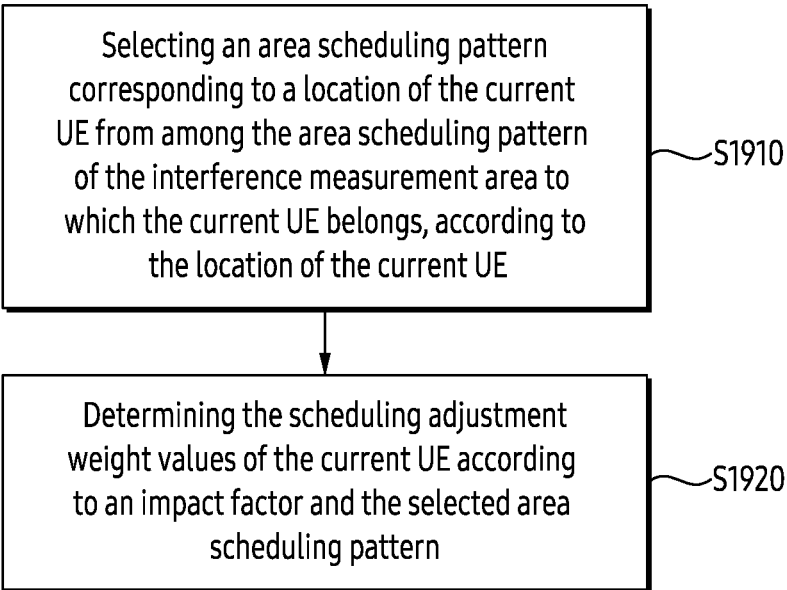

Selecting an area scheduling pattern
corresponding to a location of the current
UE from among the area scheduling pattern
of the interference measurement area to
which the current UE belongs, according to
the location of the current UE ⌇S1910

Determining the scheduling adjustment
weight values of the current UE according
to an impact factor and the selected area
scheduling pattern ⌇S1920

FIG. 19

| Initial scheduling priority | TS0 | TS1 | TS2 | TS3 |
|---|---|---|---|---|
| UE (Edge) | $P_{Edge0}$ | $P_{Edge1}$ | $P_{Edge2}$ | $P_{Edge3}$ |
| UE (Middle) | $P_{Me0}$ | $P_{Me1}$ | $P_{Me2}$ | $P_{Me3}$ |
| UE (Center) | $P_{Ce0}$ | $P_{Ce1}$ | $P_{Ce2}$ | $P_{Ce3}$ |

Enhanced scheduling priority
= Initial scheduling
priority + Scheduling
adjustment weight value

| Enhanced scheduling priority | TS0 | TS1 | TS2 | TS3 |
|---|---|---|---|---|
| UE (Edge) | $P_{Edge0}+0.4\,Q$ | $P_{Edge1}-1.3\,Q$ | $P_{Edge2}+1.6\,Q$ | $P_{Edge3}-0.7\,Q$ |
| UE (Middle) | $P_{Me0}$ | $P_{Me1}$ | $P_{Me2}$ | $P_{Me3}$ |
| UE (Center) | $P_{Ce0}-0.4\,Q$ | $P_{Ce1}+1.3\,Q$ | $P_{Ce2}-1.6\,Q$ | $P_{Ce3}+0.7\,Q$ |

FIG. 21A

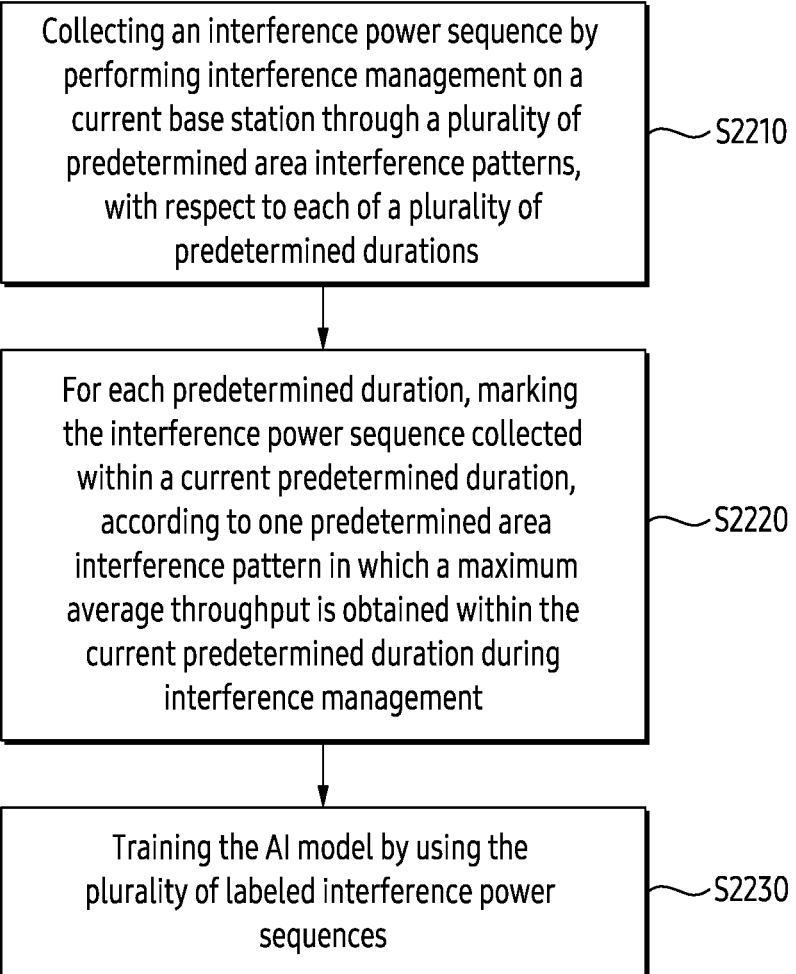

Collecting an interference power sequence by performing interference management on a current base station through a plurality of predetermined area interference patterns, with respect to each of a plurality of predetermined durations    ~S2210

For each predetermined duration, marking the interference power sequence collected within a current predetermined duration, according to one predetermined area interference pattern in which a maximum average throughput is obtained within the current predetermined duration during interference management    ~S2220

Training the AI model by using the plurality of labeled interference power sequences    ~S2230

FIG. 22

METHOD PERFORMED BY NETWORK NODE AND NETWORK NODE

CROSS-REFERENCE TO RELATED APPLICATION(S)

This application is a continuation application, claiming priority under § 365(c), of an International application No. PCT/KR2023/004953, filed on Apr. 12, 2023, which is based on and claims the benefit of a Chinese patent application number 202211610793.X, filed on Dec. 14, 2022, in the Chinese Patent Office, the disclosure of which is incorporated by reference herein in its entirety.

BACKGROUND

1. Field

The disclosure relates to a field of wireless communication. More particularly, the disclosure relates to a method performed by a network node and a network node.

2. Description of Related Art

Intra-frequency interference is caused by a useless signal that has a same frequency as a useful signal, and this interference damages a reception performance of the useful signal. The intra-frequency interference is always an important problem faced by wireless communication systems. For the 4th generation mobile communication (4G), since most base stations use the same frequency for network connections, a signal in a neighbor cell becomes an intra-frequency interference for a signal in a current serving cell. For the fifth generation mobile communication (5G), since it uses a higher frequency band for networking, a cell radius is smaller, and base stations and users are denser, a problem of the intra-frequency interference is more prominent.

How to better solve the problem of the intra-frequency interference to better meet communication requirements is a technical problem that those skilled in the art have been working on.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method performed by a network node and a network node.

Additional aspects will be set forth in part in the description which follows and, in part, will be apparent from the description, or may be learned by practice of the presented embodiments.

In accordance with an aspect of the disclosure, a method performed by a network node is provided. The method includes predicting interference information about interference suffered by a current cell, determining scheduling priorities of respective user equipment (UE) at different time units according to the predicted interference information and locations of the UEs in the current cell, and scheduling UEs in the current cell according to the determined scheduling priorities.

In accordance with an aspect of the disclosure, a method performed by a network node is provided. The method includes obtaining interference information for a current cell, the interference information for indicating interference levels at time units of a next period in each interference measurement area of a plurality of interference measurement areas of the current cell, obtaining scheduling priorities of user equipments (UEs) at the time units of the next period according to the interference information and locations of the UEs in the current cell, and performing a scheduling of the UEs in the current cell according to the scheduling priorities.

In accordance with an aspect of the disclosure, a network node is provided. The network node includes a transceiver, and a processor, coupled to the transceiver and configured to perform the method as described above.

In accordance with an aspect of the disclosure, an electronic apparatus is provided. The electronic apparatus includes at least one processor, and at least one memory storing computer executable instructions, wherein the computer executable instructions, when being executed by the at least one processor, cause the at least one processor to perform the method as described above.

In accordance with another aspect of the disclosure, a computer readable storage medium storing instructions, characterized in that the instructions, when being executed by at least one processor, cause the at least one processor to perform the method as described above is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates a schematic diagram of an impact of an interference on a UE at an edge location of a cell according to an embodiment of the disclosure;

FIG. 3B is a diagram illustrating an example of an area interference pattern according to an embodiment of the disclosure;

FIG. 5 is a schematic diagram illustrating division of a cell according to an embodiment of the disclosure;

FIG. 8 is a flowchart illustrating a process of predicting an area interference pattern of one interference measurement area by a rule-based non-artificial intelligence (AI) method according to an embodiment of the disclosure;

FIG. 10 is a flowchart illustrating a process of determining matrix elements in an interference power matrix (i.e., interference powers of each interference measurement area at each time unit) according to an embodiment of the disclosure;

FIG. 11 is a diagram illustrating an example of one area interference pattern table according to an embodiment of the disclosure;

FIG. 12 is a schematic diagram illustrating a process of determining an area interference pattern of each interference measurement area through an AI model, according to an embodiment of the disclosure;

FIG. 15 is a flowchart illustrating a process of determining an area scheduling pattern of each interference measurement area based on a predicted area interference pattern of each interference measurement area according to an embodiment of the disclosure;

FIG. 19 is a flowchart illustrating a process of determining scheduling adjustment weight values of each UE based on a location of each UE and an area scheduling pattern of an interference measurement area to which the UE belongs according to an embodiment of the disclosure;

FIG. 21A illustrates a schematic diagram of a process of determining scheduling priorities of a UE at an edge location, a UE at a central location, and a UE at a middle location in an interference measurement area, according to an embodiment of the disclosure;

FIG. 22 is a flowchart illustrating a process of training an AI model according to an embodiment of the disclosure;

The same reference numerals are used to represent the same elements throughout the drawings.

DETAILED DESCRIPTION

Figure 2:
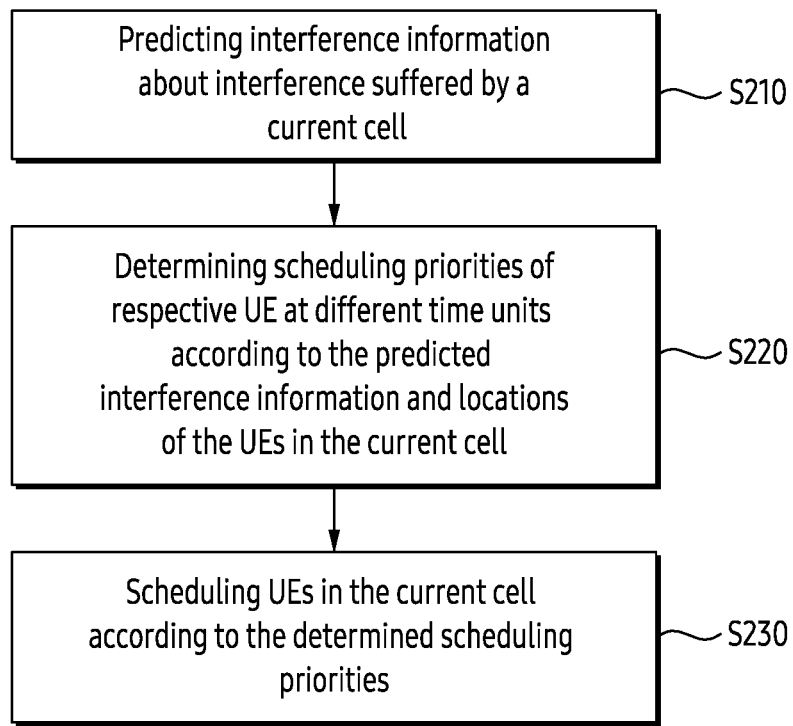
FIG. 2 is a flowchart illustrating a method performed by a network node according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It may be understood by those skilled in the art that singular forms "a", "an", "the" and "this" used herein may also include plural forms unless specifically stated. It should be further understood that the terms "include" and "comprise" used in the embodiments of the disclosure mean that a corresponding feature may be implemented as the presented feature, information, data, step, operation, element, and/or component, but do not exclude implement of other features, information, data, steps, operations, elements, components and/or a combination thereof, which are supported in the present technical field. It should be understood that, when we state that one element is "connected" or "coupled" to another element, this element may be directly connected or coupled to the other element, or it may mean that a connection relationship between this element and the other element is established through an intermediate element. In addition, "connection" or "coupling" used herein may include a wireless connection or wireless coupling. The term "and/or" used herein represents at least one of items defined by this term, for example, "A and/or B" may be implemented as "A", or "B", or "A and B". When describing a plurality of (two or more) items, if a relationship between the plurality of items is not clearly defined, between the plurality of items may refer to one, more or all of a plurality of items. For example, for a description of "a parameter A includes A1, A2, A3", it may be implemented that the parameter A includes A1, or A2, or A3, and it may also be implemented that the parameter A includes at least two of the three parameters A1, A2, A3.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

FIG. 1 illustrates a schematic diagram of an impact of an interference on a UE at an edge location of a cell according to an embodiment of the disclosure.

Referring to FIG. 1, with respect to a UE at a cell center, intra-frequency interference has a more severe impact on throughput of a UE at a cell edge. As shown in the upper drawing of FIG. 1, for an uplink, when a UE located at the cell edge performs uplink transmission for a base station, there is the intra-frequency interference from a UE in another nearby neighbor cell. As shown in the lower drawing of FIG. 1, for a downlink, when a base station performs downlink transmission for the UE located at the cell edge, there is the intra-frequency interference from another nearby base station. However, UEs located at center locations of the respective cell of the two base stations suffer less intra-frequency interference regardless of uplink or downlink.

In a 5G system, a Physical Resource Block (PRB) interference randomization scheme is commonly used to stagger interference to avoid effect thereof. However, the existing PRB interference randomization scheme only avoid the intra-frequency interference in a frequency domain, which does not take into account locations (e.g., a center location or edge location of a cell) and scheduling time of UEs, and are only effective at a low service volume and a low PRB utilization. However, a PRB utilization in a real network is usually high, especially when services are busy. As a use of a new high-bandwidth service in the 5G system increases, the PRB utilization becomes higher. Therefore, the existing PRB interference randomization scheme cannot solve the interference problem, and the interference remains high. In addition, new services of 5G such as ultra-high-definition video communication, big data collection, intelligent monitoring, Augmented Reality (AR)/Virtual Reality (VR), and living streaming, require am extremely high transmission rate. However, when the UE at the cell edge with a poor channel condition encounter high interference, they can only use a low Modulation and Coding Scheme (MCS) and a low transmission rate, and cannot meet new requirements. The interference has a significant impact on the UEs at the cell edge. The UEs at the cell edge suffered to the high interference can only use the low transmission rate and cannot use the new high-bandwidth services of 5G, and the throughput of the system is also reduced.

FIG. 2 is a flowchart illustrating a method performed by a network node according to an embodiment of the disclosure. The network node may be a next generation base station (gNB, which may also be referred to as a base station, data unit, etc.), an Open Radio Access Network (ORAN) RAN Intelligent Controller (RIC) entity, or other network-side entity that may determine scheduling priorities of UEs and allocate resources to the UE, but the disclosure is not limited to these. The network node may also be a network server that receives various information from the gNB, ORAN RIC entity, etc., determines the scheduling priorities of the UEs based on the received information, allocates the resources to the UEs, and transmits an allocation scheme to the gNB, ORAN RIC entity, etc. The network node can be composed of one entity or a plurality of sub-entities. When the network node is composed of the plurality of sub-entities, different functions may be performed by the plurality of sub-entities, respectively, and each sub-entity may have a corresponding name, and connections between the sub-entities may be wired connections or wireless connections, which are not specifically limited by the disclosure. For the convenience of description, in the following description, the network node is taken as a base station for example.

Referring to FIG. 2, at operation S210, interference information about interference suffered by a current cell may be predicted.

Figure 3A:
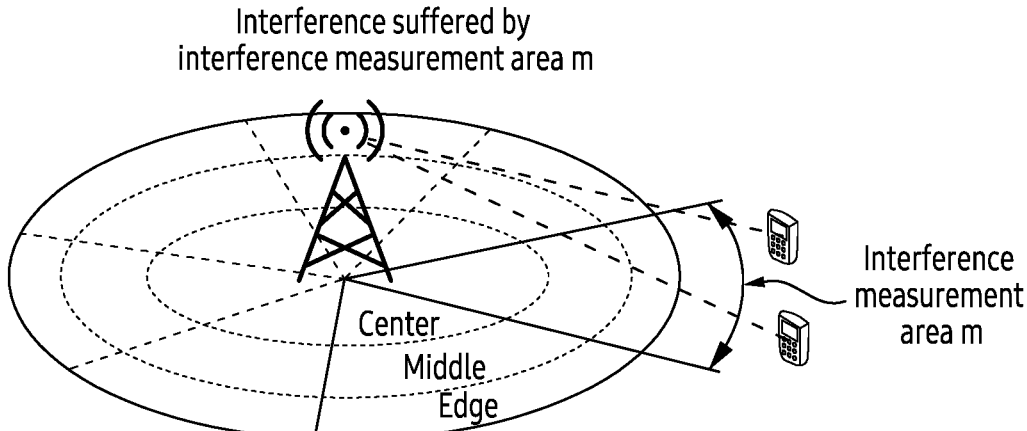
FIG. 3A is a schematic diagram illustrating division of interference measurement areas according to an embodiment of the disclosure.

FIG. 3A is a schematic diagram illustrating division of interference measurement areas according to an embodiment of the disclosure.

FIG. 3B is a diagram illustrating an example of an area interference pattern according to an embodiment of the disclosure.

Referring to FIGS. 3A and 3B, in an actual communication environment, the current cell is suffered to interference from a plurality of neighbor cells around it. Since the interference suffered by different areas of the cell may be different, in order to obtain more accurate interference information, the cell is divided into a plurality of interference measurement areas as shown in FIG. 3A. Thus, the predicting the interference information about the interference suffered by the current cell may include: dividing the current cell into the plurality of interference measurement areas; predicting interference information about interference suffered by each interference measurement area.

In order to make the divided interference measurement areas more reasonable, the current cell may firstly be divided into a plurality of unit areas, and then the plurality of interference measurement areas may be obtained by using merging of several unit areas according to a predetermined rule, which are described in detail below with reference to FIGS. 4 and 5.

Figure 4:
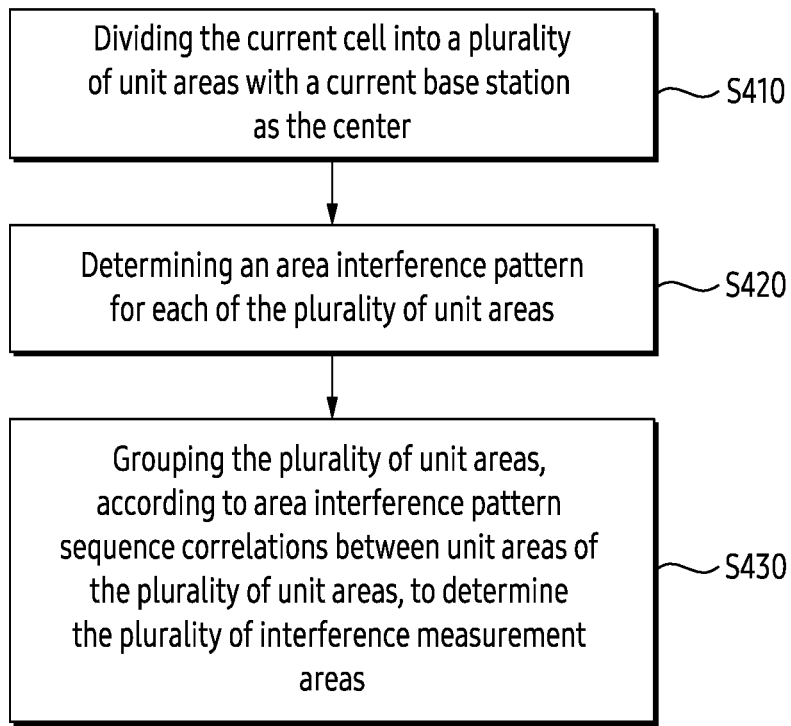
FIG. 4 is a flowchart illustrating a process of dividing a current cell into a plurality of interference measurement areas according to an embodiment of the disclosure.

FIG. 4 is a flowchart illustrating a process for dividing a current cell into a plurality of interference measurement areas according to an embodiment of the disclosure.

FIG. 5 is a schematic diagram illustrating the division of a cell according to an embodiment of the disclosure.

Referring to FIGS. 4 and 5, at operation S410, the current cell may be divided into a plurality of unit areas with a current base station as the center. As shown in panel (a) of FIG. 5, the current cell is divided into W sectorial unit areas, for example, the current cell is divided into 36 unit areas according to one sectorial area per 10°, but this is only an illustrative example and the disclosure is not limited to this, for example, the current cell is divided into 18 unit areas according to a one sectorial area per 20°. Furthermore, panel

7

8

(a) of FIG. 5 illustrates division of one base station corresponding to one cell, and in addition, the above division is also applicable when a current base station corresponds to a plurality of cells, for example, one of three cells corresponding to the current base station may be divided into W sectorial unit areas in a manner as shown in panel (b) of FIG. 5. Also, the example here is to divide the current area according to one sectorial area with the same angle, but the disclosure is not limited to this, and it is possible to divide the current cell without dividing it according to one sectorial area with the same angle.

At operation S420, an area interference pattern for each of the plurality of unit areas may be determined.

Specifically, in the disclosure, the area interference pattern represents a coding combination of an intensity of the intra-frequency interference of adjacent cells suffered by one area at respective time unit within a predetermined time, and in the disclosure, the time unit may be, for example, a time slot, and at this time, the above predetermined time may be, for example, a wireless frame comprising four time slots, but the disclosure is not limited thereto. In the following description, for ease of description, the time unit is taken as a time slot for example. In addition, the intensity of the intra-frequency interference of the adjacent cells suffered by one area at respective time unit within the predetermined time may be, for example, a three-level intensity division such as high, medium and low, and furthermore, high, medium and low referred to herein in a certain sense indicate that the intra-frequency interference intensity is relatively high, relatively medium and relatively low. However, the disclosure is not limited to this, and the intensity of the intra-frequency interference of the adjacent cells suffered by one area at respective time unit within the predetermined time may also be, for example, a four-level intensity division, a five-level intensity division, and the like, according to the intensity from high to low. In the following description, for ease of description, the three-level intensity division such as high, medium and low is taken as an example to describe the area interference pattern, and at this time, the area interference pattern may be represented by a coding combination shown in Table 1 below. Furthermore, in the disclosure, in order to limit adjustment of priorities of the UE only suitable for those time units in a current pattern, scheduling priorities between different area scheduling patterns of the UE are not changed, and +1 and −1 need to appear in pairs in each area interference pattern, as shown in FIG. 3B. Furthermore, in each area interference pattern, the interference suffered by the current cell at different time units is a sum of interference from at least one other neighbor cell, wherein each neighbor cell may generate, on the current cell, interference in different intensity, e.g., as shown in FIG. 3B, for pattern 16, interferences suffered by a current cell 0 at time units TS0, TS1, TS2 and TS3 is [−100 dBm, −85 dBm, −110 dBm, −90 dBm], wherein each of interference is a sum of interference from other neighbor cells 1, 2 . . . G. In FIG. 3B, the interference on the current cell 0 generated by each neighbor cell is indicated by a thick arrow representing strong interference or a thin arrow representing weak interference. In addition, the above mentioned one area may be the unit area herein or the interference measurement area, and the disclosure may employ an AI method or a rule-based non-AI method to determine the area interference pattern for the unit area and the interference measurement area. How to determine the area interference pattern will be described in detail with reference to FIGS. 8 and 12.

TABLE 1

| Intensity of intra-frequency interference of adjacent cells suffered by one area at one time unit | Coding |
|---|---|
| High | +1 |
| Medium | 0 |
| Low | −1 |

At operation S430, the plurality of unit areas may be grouped, according to area interference pattern sequence correlations between unit areas of the plurality of unit areas within a period of time, to determine the plurality of interference measurement areas, wherein the area interference pattern sequence correlation represents a correlation between area interference pattern sequences of two unit areas within a period of time (e.g., 1 minute). This is described in detail below with reference to FIG. 6.

Figure 6:
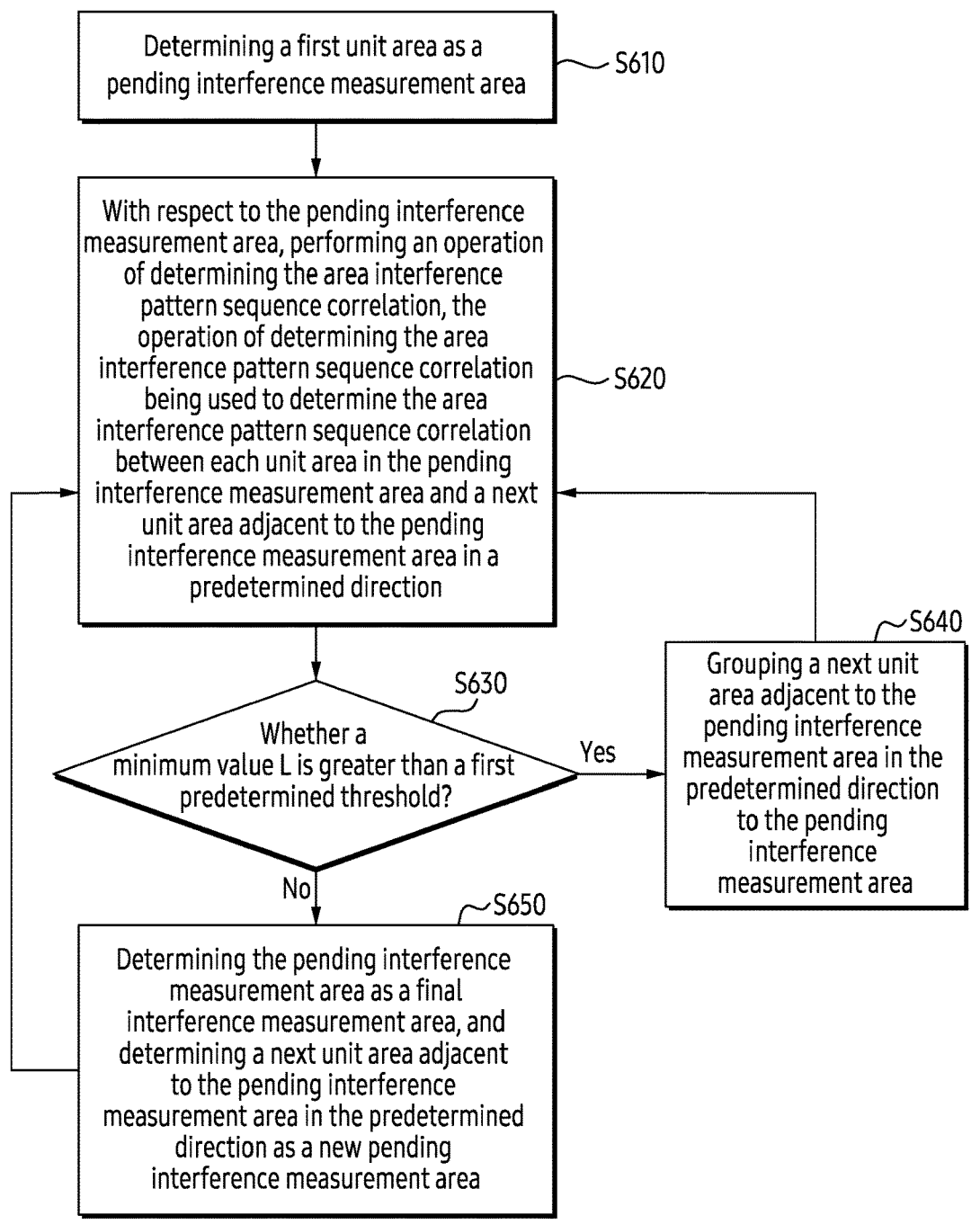
FIG. 6 is a flowchart illustrating a process of determining a plurality of interference measurement areas by grouping a plurality of unit areas according to an embodiment of the disclosure.

FIG. 6 is a flowchart illustrating a process of determining a plurality of interference measurement areas by grouping a plurality of unit areas according to an embodiment of the disclosure.

Referring to FIG. 6, at operation S610, a first unit area may be determined as a pending interference measurement area. For example, a unit area 1 in panel (a) of FIG. 5 is determined as the pending interference measurement area, and since it has not yet been determined whether the unit area 1 may be merged with a next unit area 2 to form an interference measurement area, the unit area 1 may currently be determined as the pending interference measurement area.

At operation S620, with respect to the pending interference measurement area, an operation of determining the area interference pattern sequence correlation may be performed, wherein, the operation of determining the area interference pattern sequence correlation is used to determine the area interference pattern sequence correlation between each unit area in the pending interference measurement area and a next unit area adjacent to the pending interference measurement area in a predetermined direction.

Specifically, the above predetermined direction may be clockwise or counterclockwise, and in the following description it is assumed that the predetermined direction is clockwise. At the first execution of operation S620, only the first unit area (e.g., the unit area 1 in panel (a) of FIG. 5) is included in the pending interference measurement area, and the next unit area adjacent to the pending interference measurement area in the clockwise direction is the second unit area (e.g., the unit area 2 in panel (a) of FIG. 5), thus, operation S620 only needs to determine, according to the following Equation 1, the area interference pattern sequence correlation between the first unit area and the second unit area.

$$\rho_{m,k} = \frac{\left| A_k A_m^H \right|}{\|A_k\| \|A_m\|}$$

Equation 1 wherein, $\rho_{m,k}$ represents an area interference pattern sequence correlation between a unit area m and a unit area k within a period of time, Ak and Am represent area interference pattern sequences between the unit area k and the unit area m within the period of time, and $$A_m^H$$

US 12,684,610 B2

9 represents a transposed matrix of Am, $\|A_k\|$ and $\|A_m\|$ represent norms of Ak and Am, respectively.

$$|A_k A_m^H|$$

represents a solution of a determinant of the matrix $$A_k A_m^H.$$

For example, there are 12 time units in the period of time, and every 4 time units constitute one radio frame, and each radio frame has a corresponding area interference pattern. The area interference pattern sequence Ak for the unit area k may be, for example, {(−1,1,0,0), (1,−1,0,0), (−1,1,1,−1), (−1,−1,1,1)}, and the area interference pattern sequence Am for the unit area m may be, for example, {(1,−1,−1,1), (−1,1,0,0), (−1,−1,1,1), (0,0,−1,1)}, and to this end, the area interference pattern sequence correlation between the unit area m and the unit area k within the period of time may be determined according to Equation 1 above.

At operation S630, whether a minimum value L among the area interference pattern sequence correlations between the next unit area adjacent to the pending interference measurement area in the predetermined direction and each unit area in the pending interference measurement area is greater than the first predetermined threshold is determined.

If this minimum value L is greater than the first predetermined threshold, at operation S640, the next unit area adjacent to the pending interference measurement area in the predetermined direction is grouped to the pending interference measurement area, and returning to operation S620 to perform the operation of determining the area interference pattern sequence correlation in operation S620 with respect to the pending interference measurement area at this time.

If this minimum value L is not greater than the first predetermined threshold, at operation S650, the pending interference measurement area may be determined as a final interference measurement area and the next unit area adjacent to the pending interference measurement area in the predetermined direction is determined as a new pending interference measurement area, and then returning to operation S620 to perform the operation of determining the area interference pattern sequence correlation in operation S620 with respect to the pending interference measurement area at this time.

Specifically, for example, as shown in panel (a) of FIG. 5, when the pending interference measurement area includes only the unit area 1, the next unit area adjacent to the pending interference measurement area in the clockwise direction is the unit area 2 among the plurality of unit areas, and if an area interference pattern sequence correlation $\rho_{2,1}$ between the unit area 2 and the unit area 1 is not greater than the first predetermined threshold at this time, proceeding to operation S650, the pending interference measurement area at this time may be determined as one final interference measurement area, for example, as a first interference measurement area, and the next unit area 3 adjacent to the pending interference measurement area in the clockwise direction is determined as the new pending interference measurement area, and returning to operation S620 to perform the operation of determining the area interference pattern sequence correlation in operation S620 with respect to the pending interference measurement area at this time, to determine an area interference pattern sequence correlation between the next unit area 4 adjacent to the pending interference measurement area at this time in the predetermined direction and each unit area (i.e., the unit area 3) in the pending interference measurement area, that is, to determine an area interference pattern sequence correlation $\rho_{4,3}$ between the unit area 4 and the unit area 3, and then operation S630 is performed for the determining.

If the area interference pattern sequence correlation $\rho_{2,1}$ between the unit area 2 and the unit area 1 is greater than the first predetermined threshold, then at operation S640, the unit area 2 is grouped to the pending interference measurement area, that is, is merged into the pending interference measurement area, wherein the pending interference measurement area at this time includes the unit area 1 and the unit area 2. Thereafter, returning to operation S620, the operation of determining the area interference pattern sequence correlation in operation S620 is performed with respect to the pending interference measurement area at this time, to determine an area interference pattern sequence correlation between the next unit area 3 adjacent to the pending interference measurement area at this time in the clockwise direction and each unit area in the pending interference measurement area, that is, to determine an area interference pattern sequence correlations $\rho_{3,2}$ and $\rho_{3,1}$ between the unit area 3 and each of the unit area 1 and the unit area 2, and then operation S630 is performed, to determine whether $\min(\rho_{3,1}, \rho_{3,2})$ is greater than the first predetermined threshold, and if $\min(\rho_{3,1}, \rho_{3,2})$ is greater than the first predetermined threshold, proceeding to operation S640 to group the unit area 3 into the pending interference measurement area, that is, the unit area 3 is merged with the unit area 1 and the unit area 2, and then returning to operation S620, the operation for the unit area 4 is continued.

By the process shown in FIG. 6, the plurality of interference measurement areas are determined until the last unit area of the plurality of unit areas is grouped, for example, until the grouping of the unit area W in panel (a) of FIG. 5 is completed. As described above with reference to panel (a) of FIG. 5, in the same way, the plurality of interference measurement areas may be determined in the above manner for the W unit areas shown in panel (b) of FIG. 5.

Figure 7:
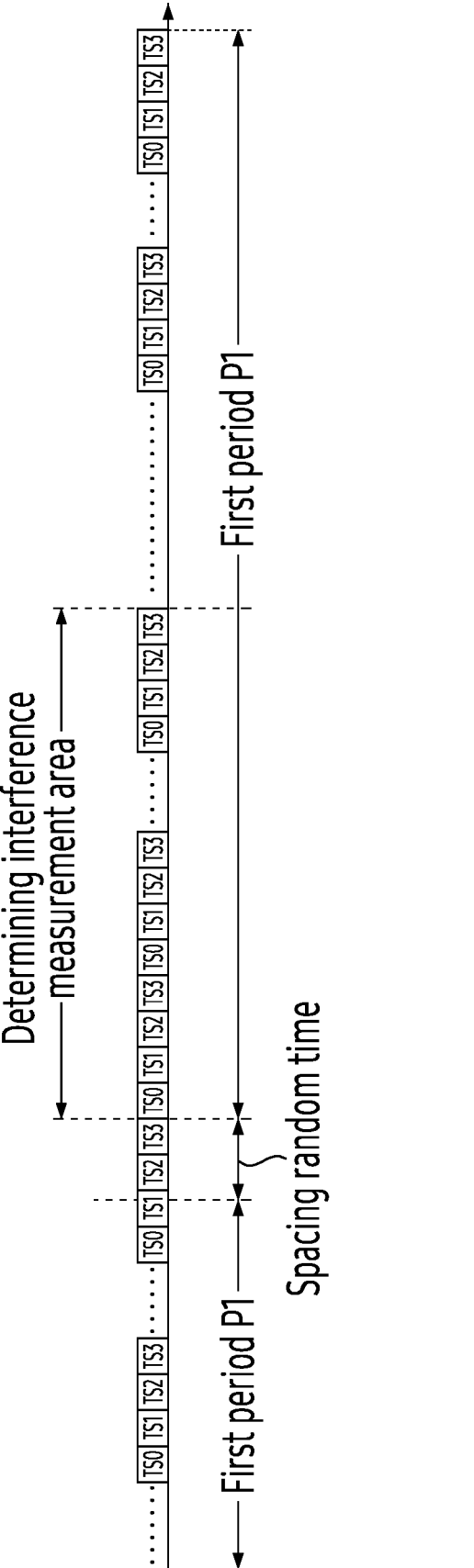
FIG. 7 is a diagram illustrating a relationship between an interference area division operation and a first period according to an embodiment of the disclosure.

FIG. 7 is a diagram illustrating a relationship between an interference area division operation and a first period according to an embodiment of the disclosure.

Referring to FIG. 7, the above operation of dividing the current cell into the plurality of interference measurement areas is performed at the beginning of each first period P1. For example, the first period P1 is 1 hour or 1 day. In addition, two consecutive first periods P1 are spaced with random time, thus avoiding simultaneous changes of area interference patterns among individual cells.

The above process may divide the current cell into the plurality of interference measurement areas, and then, the interference information about interference suffered by each interference measurement area may be predicted. Specifically, the predicting the interference information about interference suffered by each interference measurement area may include: predicting an area interference pattern of a current interference measurement area at a current second period according to historical interference information of the current interference measurement area, that is, in the disclosure, the historical interference information of the current interference measurement area may be an interference power sequence collected by the current interference measurement area at the previous second period. In addition, the interference information about interference suffered by the current interference measurement area may include the area interference pattern of the current interference measurement area at the current second period. As described above with reference to operation S420, the area interference pattern may represent the coding combination of the intensity of the intra-frequency interference of adjacent cells suffered by one area at respective time unit within the predetermined time. In the disclosure, an AI method or a rule-based non-AI method may be periodically used to determine the area interference pattern for one area (i.e., a unit area and an interference measurement area) in accordance with the second period. Since the interference measurement area is generated by merging several unit areas and in some cases the interference measurement area is a single unit area, and the process of determining the area interference pattern for the interference measurement area is the same as that of determining the area interference pattern for the unit area, therefore, in the disclosure, the process of determining the area interference pattern is described by taking the interference measurement area as an example. Further, in the disclosure, the second period is typically much smaller than the first period, for example, the first period may be, for example, 1 hour or 1 day, and the second period may be, for example, 200 ms.

The process of predicting the area interference pattern of the current interference measurement area at the current second period according to the historical interference information of the current interference measurement area, by the rule-based non-AI method and the AI method, is described successively below.

FIG. 8 is a flowchart illustrating a process of predicting an area interference pattern of one interference measurement area by a rule-based non-AI method according to an embodiment of the disclosure.

Referring to FIG. 8, at operation S810, one interference power matrix of the plurality of interference measurement areas is determined, according to an interference power of each time unit in the previous second period collected at each interference measurement area. Specifically, Equation 2 below illustrates a specific form of this interference power matrix.

$$InterPower_{T*M} = \begin{bmatrix} P_{0,0} & \cdots & P_{0,M-1} \\ \vdots & \ddots & \vdots \\ P_{T-1,0} & \cdots & P_{T-1,M-1} \end{bmatrix}_{T*M} \qquad \text{Equation 2}$$

Wherein, T represents the number of time units within a predetermined duration.

Figure 9:
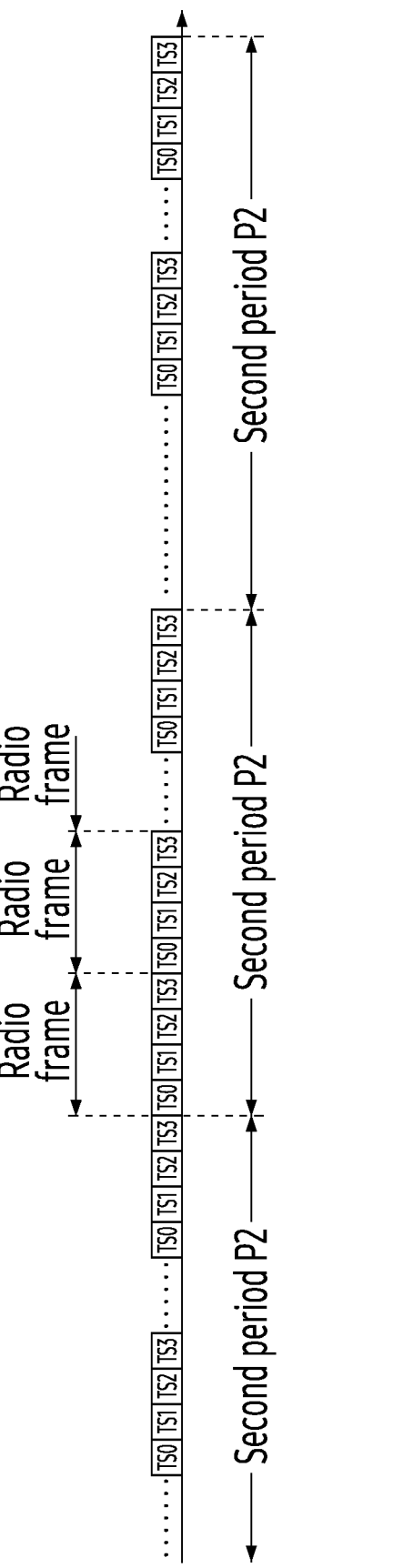
FIG. 9 is a schematic diagram illustrating a structure of a second period according to an embodiment of the disclosure.

FIG. 9 is a schematic diagram illustrating a structure of a second period according to an embodiment of the disclosure.

Referring to FIG. 9, there are a plurality of predetermined durations in each second period, and each predetermined duration consists of a plurality of time units, for example, each second period contains a plurality of radio frames, and each radio frame contains 4 time units (e.g., time slots TS0, TS1, TS2, and TS3), and the predetermined duration may be one radio frame or a plurality of radio frames, i.e., J radio frames, wherein J is a positive integer greater than or equal to 1. In this case, T=4×J. M represents the total number of interference measurement areas in the current cell. Thus, Pt,m in the interference power matrix InterPower represents a filtered interference power obtained by filtering an average interference power of all time units TSts within the previous second period at the mth interference measurement area. This will be described in detail below with reference to FIG. 10.

FIG. 10 is a flowchart illustrating a process of determining matrix elements in an interference power matrix (i.e., interference power of each interference measurement area at each time unit) according to an embodiment of the disclosure. Before proceeding with the process of FIG. 10, it is necessary to collect interference power of each time unit (e.g., time slot) in each interference measurement area during the previous second period, and then the operations shown in FIG. 10 is performed with respect to each of the plurality of interference measurement areas.

Referring to FIG. 10, at operation S1010, by averaging interference powers of time units TSts with a same serial number in the previous second period with respect to the current interference measurement area, an average interference power of the current interference measurement at these time units TSts of the previous second period area may be obtained.

Specifically, as shown in FIG. 9, each radio frame contains four time units TS0, TS1, TS2 and TS3. Assuming that each second period contains 10 radio frames, then for the current interference measurement area, an average interference power of 10 TS0s, an average interference power of 10 TS1s, an average interference power of 10 TS2s and an average interference power of 10 TS3s in the previous second period are calculated, respectively.

Then, at operation S1020, the average interference power of the current interference measurement at these time units TSts of the previous second period area is filtered, based on a historical filtered interference power of the current interference measurement area at the time units TSts, to obtain a filtered interference power of the current interference measurement area at the time units TSts of the previous second period. Specifically, this average interference power may be filtered according to the following Equation 3.

$$P_{filter} = a \times \overline{P}_{filter} + (1-a) \times P_{ave} \qquad \text{Equation 3}$$

wherein, $P_{ave}$ represents an average interference power of one interference measurement area at time units with a same serial number in a second period, and $P_{filter}$ indicates the filtered interference power of this interference measurement area at these time units of this second period, $\overline{P}_{filter}$ represents the historical filtered interference power of this measurement interference area at these time units, a represents a filtering coefficient and is settable.

In addition, the historical filtered interference power of the current interference measurement area at the time units TSts is updated as the filtered interference power of the current interference measurement area at the time units TSts of the previous second period, that is, whenever a filtered interference power of one interference measurement area at one time unit is obtained, the obtained filtered interference power of this interference measurement area at this time unit may be used for updating the historical filtered interference power of this interference measurement area at this time unit.

At operation S1030, the filtered interference power of the current interference measurement area at the time units TSts of the previous second period may be set as the interference power of the current interference measurement area at the time units TSts in the interference power matrix. The filtered interference power for each of the time units TS0, TS1, TS2 and TS3 in the previous second period may be determined for the current interference measurement area by each of the steps described above, thus a column of elements in the interference power matrix expressed by the above Equation 2 is determined.

Accordingly, the interference power matrix for the plurality of interference measurement areas may be obtained, by performing the operation shown in FIG. 10 with respect to each of the plurality of interference measurement areas.

Referring back to FIG. 8, at operation S820, one area interference pattern matrix CMatrix$_{N*T}$ is selected from an area interference pattern table including at least one area interference pattern matrix according to serial numbers of time units within the current second period.

Specifically, the area interference pattern table may include at least one area interference pattern matrix, each area interference pattern matrix represents all possible area interference patterns within a predetermined duration (e.g., one radio frame or a plurality of radio frames, i.e., J radio frames, wherein J is a positive integer greater than or equal to 1), and this interference pattern table is preset.

FIG. 11 is a diagram illustrating an example of area interference pattern table according to an embodiment of the disclosure.

Referring to FIG. 11, As described above with reference to FIG. 3B, in each area interference pattern, +1 and −1 need to appear in pairs, thus, in two area interference pattern matrices CMatrix1 and CMatrix2 contained in the area interference pattern table shown in FIG. 11, the area interference pattern matrix CMatrix1 contains a total of 6 area interference patterns, and the area interference pattern matrix CMatrix2 contains a total of 18 area interference patterns. Assuming that serial numbers of the time units in the current second period are TS0, TS1, TS2 and TS3, that is, each predetermined duration within the second period contains only 4 time units TS0, TS1, TS2 and TS3, and at this time, according to the serial numbers of the available time units (i.e., TS0, TS1, TS2 and TS3) of an uplink/downlink within the current second period, the area interference pattern matrix CMatrix2 is selected from the area interference pattern table shown in FIG. 11.

At operation S830, the area interference pattern of the current interference measurement area at the current second period may be predicted according to the interference power matrix and the selected area interference pattern matrix.

Specifically, firstly, as shown in Equation 4 below, a result matrix is determined based on a multiplication of an interference power matrix InterPower$_{T*M}$ and the area interference pattern matrix CMatrix$_{N*T}$.

$$CMatrix_{N*T} * InterPower_{T*M} = \begin{bmatrix} V_{0,0} & \cdots & V_{0,M-1} \\ \vdots & \ddots & \vdots \\ V_{N-1,0} & \cdots & V_{N-1,M-1} \end{bmatrix} \quad \text{Equation 4}$$

wherein N represents the total number of area interference patterns in the selected area interference pattern matrix CMatrix$_{N*T}$, and T represents the serial numbers of the available time units of the uplink/downlink within the second period, that is, the number of time units within the predetermined duration, wherein, as described above, the second period includes the plurality of predetermined durations, each predetermined duration may be one radio frame or a plurality of radio frames, that is, J wireless frames, wherein J is a positive integer greater than or equal to 1. That is, each predetermined duration consists of a plurality of time units with different serial numbers of time units. As shown in FIG.

9, each predetermined duration (e.g., one radio frame) contains 4 time units TS0, TS1, TS2, and TS3, thus, for FIG. 9, T is 4. M represents the total number of interference measurement areas in the current cell.

Then, a maximum value among a plurality of matrix elements corresponding to the current interference measurement area may be determined from among the result matrix. Specifically, the maximum value is selected from a column of matrix elements corresponding to the current interference measurement area in the result matrix.

Finally, an area interference pattern corresponding to this maximum value in the area interference pattern matrix CMatrix$_{N*T}$ may be determined as the area interference pattern of the current interference measurement area at the current second period.

For example, assuming that the interference power of 4 time units in the current interference measurement area is [−100 dBm, −80 dBm, −110 dB, −90 dBm], one column of matrix elements corresponding to the current interference measurement area in the result matrix is one column of data indicated by 1110 in FIG. 11, wherein 40 is the maximum value in this column of matrix elements, and accordingly, an area interference pattern 16 corresponding to 40 is determined as the area interference pattern of the current interference measurement area at the current second period.

By performing the operations of FIG. 8 above with respect to each of the plurality of interference measurement areas, the area interference pattern for each of the interference measurement areas may be determined.

The process described above with reference to FIG. 8 is the process of determining the area interference pattern for each interference measurement area by the rule-based non-AI method, that is, an area interference pattern is predefined firstly and then a predefined area interference pattern that is most relevant to an actual historical interference is found as the predicted area interference pattern. In addition, the disclosure may also determine the area interference pattern of each interference measurement area through an AI method (i.e., an AI model), which is described in detail below.

FIG. 12 is a schematic diagram illustrating a process of determining the area interference pattern of each interference measurement area through an AI model according to an embodiment of the disclosure, wherein, in the disclosure, the AI model may be, for example, a convolutional neural network (CNN), a recurrent neural network (RNN), etc.

In summary, the following operation may be performed with respect to each of the plurality of interference measurement areas: predicting the area interference pattern of the current interference measurement area at the current second period using the historical interference information of the current interference measurement area through the AI model, wherein the historical interference information of the current interference measurement area may be an interference power sequence collected by the current interference measurement area at the previous second period.

Referring to FIG. 12, H interference power sequences (IS1, IS2, . . . ISH) collected at the previous second period P1 may be input to a trained AI model, to obtain the area interference pattern of the current interference measurement area at the current second period, wherein Inter in the table represents an interference power of a corresponding time unit, e.g. Inter10 represents an interference power of a time unit TS0 in an interference power sequence IS1. An output of the AI model is the area interference pattern (−1, 1, −1, 1) of the current interference measurement area at the current second period.

By a similar operation, the AI model may be used to obtain the area interference pattern of each interference measurement area at the current second period.

In addition, the predicting the area interference pattern of each interference measurement area may include: if an area interference pattern of any of the plurality of interference measurement areas changes, a next operation to determine the area interference pattern of the any interference measurement area is delayed, for example, the next operation to determine the area interference pattern of the any interference measurement area is extended to 2×the second period. This is to maintain stable interference and scheduling patterns, to avoid inaccurate prediction of area interference patterns due to simultaneous modification of area interference patterns and/or area scheduling patterns by a plurality of cells.

Referring back to FIG. 2, at operation S220, scheduling priorities of respective UE at different time units may be determined according to the predicted interference information and locations of the UEs in the current cell. This is described in detail below with reference to FIG. 13.

Figure 13:
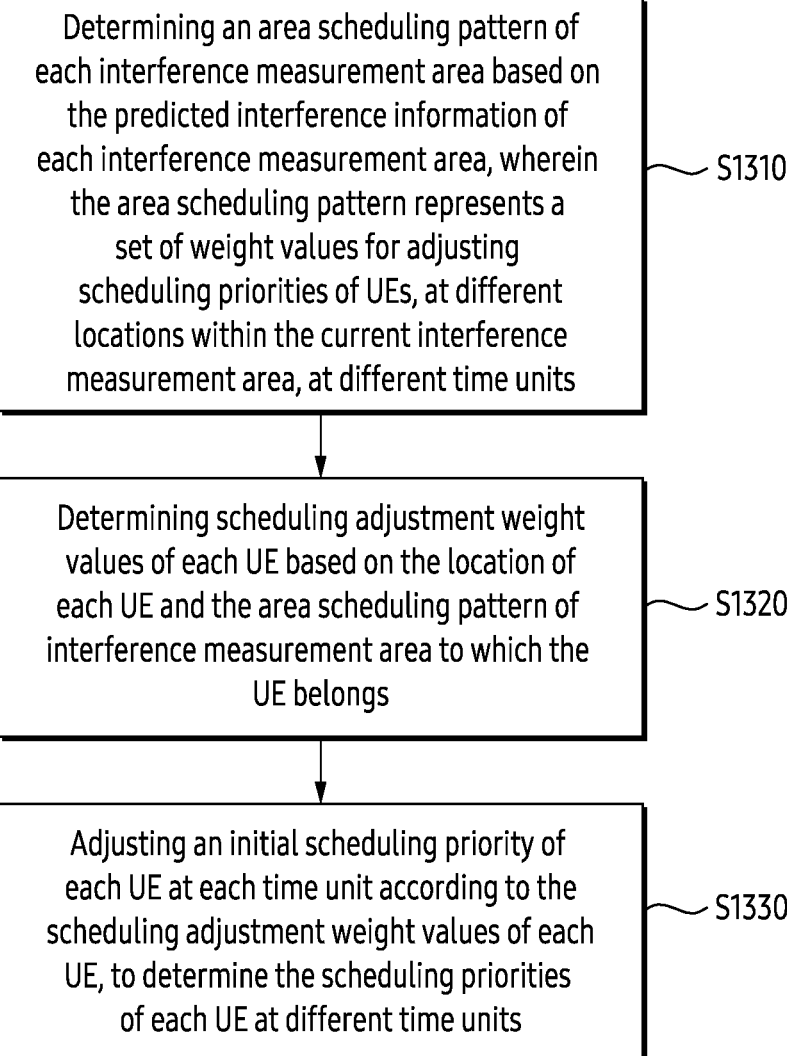
FIG. 13 is a flowchart illustrating a process of determining scheduling priorities of respective UE at different time units according to the predicted interference information and locations of UEs in a current cell, according to an embodiment of the disclosure.

FIG. 13 is a flowchart illustrating a process of determining scheduling priorities of respective UE at different time units according to a predicted interference information and locations of the UEs in a current cell, according to an embodiment of the disclosure.

Referring to FIG. 13, at operation S1310, an area scheduling pattern of each interference measurement area is determined based on the predicted area interference pattern of each interference measurement area, wherein the area scheduling pattern represents a set of weight values for adjusting scheduling priorities of UEs, at different locations within the current interference measurement area, at different time units. A UE at an edge location is far away from a base station, the signal is often poor and cannot use a higher order MCS, thus it is necessary to avoid an impact of high interference as much as possible. A UE at a central location is closer to the base station, the signal is stronger, and its anti-interference capability is better than the UE at the edge location.

Figure 14A:
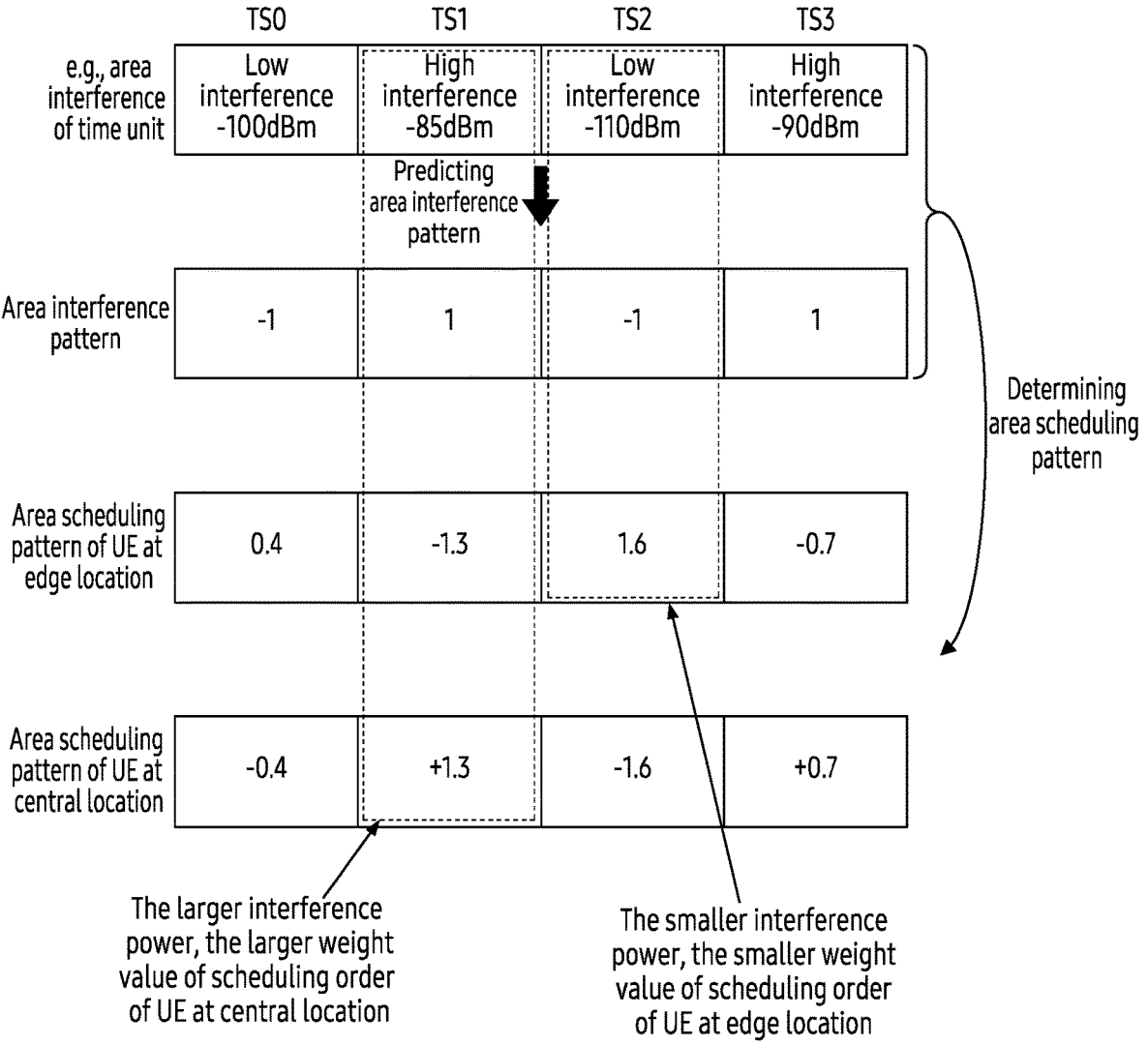
FIG. 14A is a diagram illustrating a relationship between UE locations and area scheduling patterns according to an embodiment of the disclosure.

FIG. 14A is a diagram illustrating a relationship between UE locations and area scheduling patterns according to an embodiment of the disclosure.

Figure 14B:
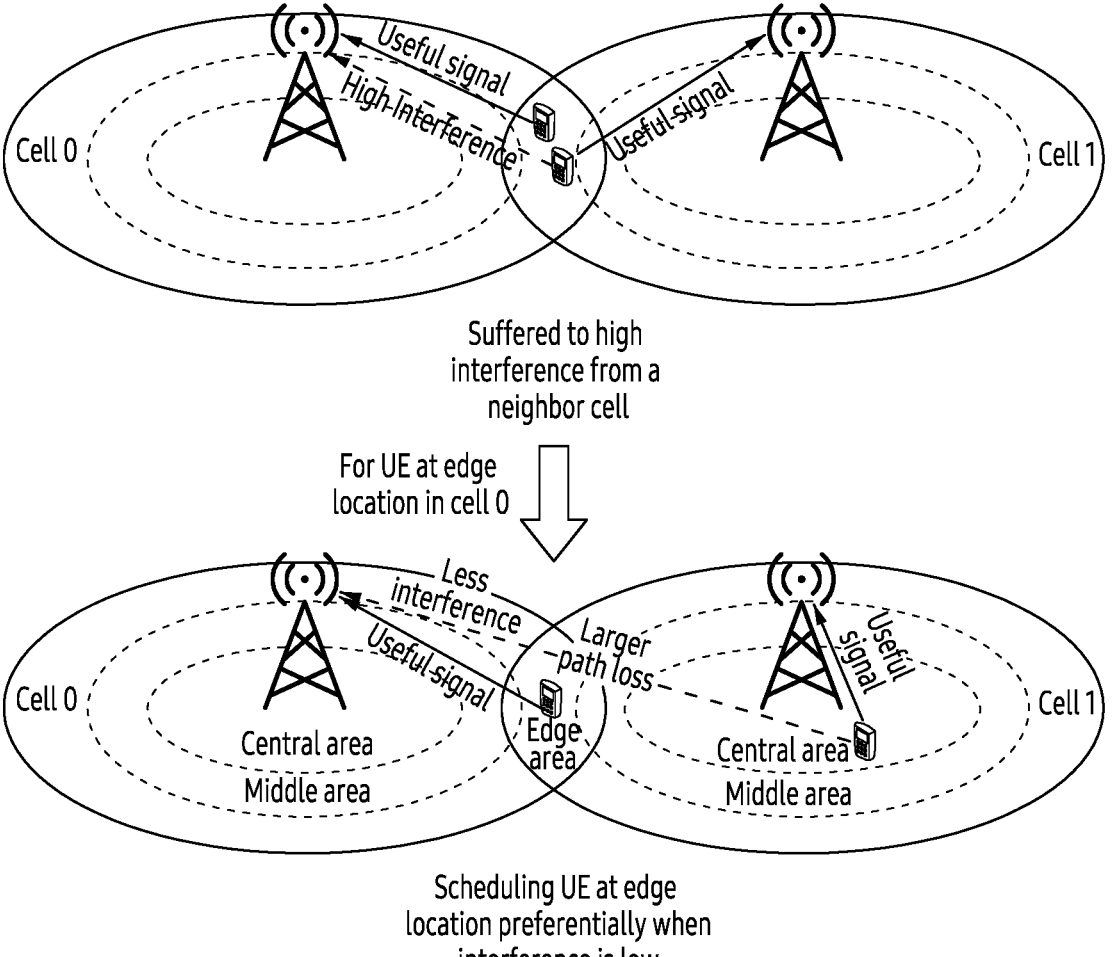
FIG. 14B is a schematic diagram illustrating a UE at a scheduling edge location according to an embodiment of the disclosure.

FIG. 14B is a schematic diagram illustrating a UE at a scheduling edge location according to an embodiment of the disclosure.

Referring to FIGS. 14A and 14B, for one interference measurement area, an interference power is lower, a weight value of a scheduling order (i.e., scheduling priority) of the UE at the edge location is higher, and the interference power is higher, a weight value of a scheduling order of the UE at the central location is higher, and thus referring to FIG. 14B, when suffering high interference from a neighbor cell, for the UE at the edge location in cell 0, the UE at the edge location may be scheduled preferentially when the interference is low. This operation S1320 is described in detail below with reference to FIG. 15.

FIG. 15 is a flowchart illustrating a process of determining an area scheduling pattern of each interference measurement area based on a predicted area interference pattern of each interference measurement area according to an embodiment of the disclosure.

Referring to FIG. 15, at operation S1510, an interference mean deviation weight of time units with the same serial number within the current second period is determined, i.e., the interference mean deviation weight of time units with each serial number within the current second period is determined. As shown in FIG. 9, the time units with the same serial number within the current second period represent, for example, TS0, TS1, TS2, and TS3 within the current second period.

Specifically, firstly, an average interference power of the time units with the same serial number (i.e., time units with each serial number) within the current second period and an average value of interference powers of all time units within the current second period may be determined.

Figure 16:
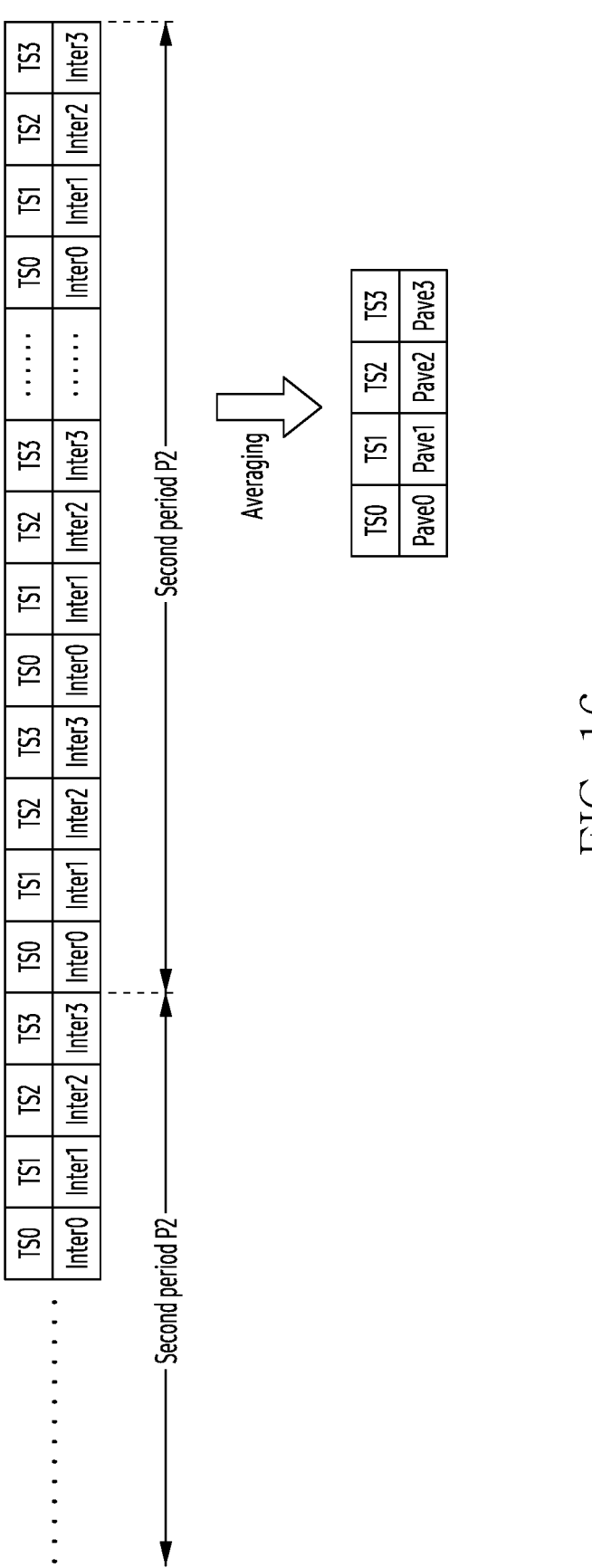
FIG. 16 is a schematic diagram illustrating a process of calculating an average interference power per time unit according to an embodiment of the disclosure.

FIG. 16 is a schematic diagram illustrating a process of calculating an average interference power per time unit according to an embodiment of the disclosure.

Referring to FIG. 16, an average interference power $Pave0$ of all time units TS0s, an average interference power $Pave1$ of all time units TS1s, an average interference power $Pave2$ of all time units TS2s and an average interference power $Pave3$ of all time units TS3s within the current second period may be calculated, respectively, and then an average value $Pave$ of interference powers of all time units (i.e., all TS0s, all TS1s, all TS2s and all TS3s) within the current second period may be calculated.

Then, an absolute difference between the average interference power of the time units with the same serial number (i.e., time units with each serial number) and the average value of the interference powers of all time units within the current second period may be calculated.

Figure 17:
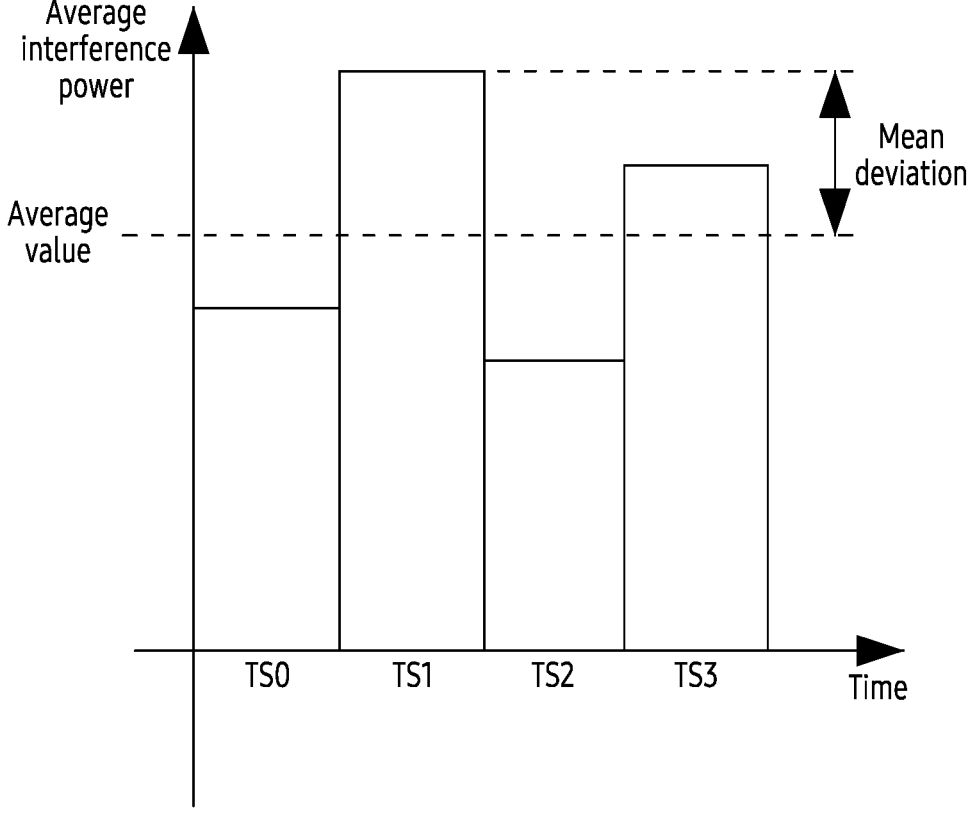
FIG. 17 illustrates an example of an absolute difference between an average interference power of time units with each serial number and an average value of interference powers of all time units within a current second period according to an embodiment of the disclosure.

FIG. 17 illustrates an example of the absolute difference (i.e., mean deviation) between the average interference power of time units with each serial number and the average value of the interference powers of all time units within the current second period according to an embodiment of the disclosure.

Referring to FIG. 17, the interference mean deviation weight of the time units with the same serial number (i.e., time units with each serial number) is determined according to the absolute difference of the time units with the same serial number (i.e., time units with each serial number). Specifically, firstly, an average value of the obtained absolute differences of time units with each serial number may be calculated using the absolute differences, and then a ratio of the absolute difference of time units with each serial number to the average value of the absolute differences is calculated, to obtain the interference mean deviation weight of time units with each serial number (e.g., each of time unit TS0, time unit TS1, time unit TS2, and time unit TS3). For example, assuming that average interference powers [$Pave0$, $Pave1$, $Pave2$, $Pave3$] of time units with each serial number TS0, TS1, TS2 and TS3 within the second period are [−100 dBm, −85 dBm, −110 dB, −90 dBm], an average value of interference powers of these time units with four serial numbers is $Pave=(Pave0+Pave1+Pave2+Pave3)/4=-96.25$ dBm, absolute differences between the average interference powers of time units with each serial number and the average value of interference powers of the time units with four serial numbers are [abs($Pave0-Pave$), abs($Pave1-Pave$), abs($Pave2-Pave$), abs($Pave3-Pave$)]=[3.75, 11.25, 13.75, 6.25], respectively, and the average value of the absolute differences of these time units with four serial numbers is $(3.75+11.25+13.75+6.25)/4=8.75$, therefore, the interference mean deviation weights of these time units with four serial numbers are [0.4, 1.3, 1.6, 0.7], respectively.

In the disclosure, the interference mean deviation weight actually characterizes a deviation between the interference powers of each time unit and their average value. The deviations of the interference powers of different time units with respect to the average value are larger, an impact of adjusting the scheduling priorities of the UE at the edge location and the UE at the central location in different time units is greater; if the interference powers on each time unit are equal, there will be no impact when adjusting the scheduling priorities of the UE at the edge location and the UE at the central location in different time units.

At operation S1520, a standard area scheduling pattern of each interference measurement area is determined according to the interference mean deviation weight of the time units with the same serial number (i.e., time units with each serial number) and an area interference pattern of each interference measurement area.

Specifically, the standard area scheduling pattern of each interference measurement area is obtained by multiplying the interference mean deviation weight of time units with each serial number and the area interference pattern of each interference measurement area. For example, as mentioned above, the interference mean deviation weights of the time units with four serial numbers are [0.4, 1.3, 1.6, 0.7], and assuming that the area interference pattern of the current interference measurement area is [−1, 1, −1, 1], the standard area scheduling pattern of the current interference measurement area is obtained by multiplying the corresponding elements among them.

$$\text{standard area scheduling pattern=interference mean}$$
$$\text{deviation weight*area interference pattern=}$$
$$[0.4,1.3,1.6,0.7]*[-1,1,-1,1]=[-0.4,1.3,-1.6,0.7] \quad \text{Equation 5}$$

The standard area scheduling pattern of each interference measurement area may be determined by the above process.

At operation S1530, area scheduling patterns of UEs at different locations in each interference area may be determined according to the standard area scheduling pattern of each interference measurement area. Wherein, the area scheduling patterns of UEs at different locations may include at least one of: an area scheduling pattern of a UE at the central location, an area scheduling pattern of a UE at the middle location and an area scheduling pattern of a UE at the edge location.

Specifically, in the disclosure, area division may be performed on the interference measurement area, for example, the interference measurement area is divided according to a distance from the base station, for example, divided into a central area closest to the base station, an edge area farthest from the base station, and a middle area between the central area and the edge area. In this case, a UE located at the central area may be referred to as a UE at the central location, a UE located at the middle area may be referred to as a UE at the middle location, and a UE located at the edge area may be referred to as a UE at the edge location. However, the disclosure is not limited to this, for example, the interference measurement area is divided into more areas or fewer areas depending on a distance from the base station, for example, the interference measurement area is divided into only the central area and the edge area without the middle area depending on the distance from the base station. In the following description, the division of the interference measurement area into the central area, the edge area, and the middle area is illustrated as an example.

With respect to the UE at the edge location in the current interference measurement area, the area scheduling pattern of the UE at the edge location is obtained by calculating a negative value of the standard area scheduling pattern of the current interference measurement area. For example, if the standard area scheduling pattern of the current interference measurement area is [−0.4, 1.3, −1.6, 0.7], the scheduling pattern of the UE at the edge location area is [0.4, −1.3, 1.6, −0.7].

Similarly, with respect to the UE at the central location in the current interference measurement area, the area scheduling pattern of the UE at the central location may be obtained by calculating a positive value of the standard area scheduling pattern of the current interference measurement area, that is, the standard area scheduling pattern of the current interference measurement area is directly used as the area scheduling pattern of the UE at the central location. For example, if the standard area scheduling pattern of the current interference measurement area is [−0.4, 1.3, −1.6, 0.7], the area scheduling pattern of the UE at the central location is [−0.4, 1.3, −1.6, 0.7].

With respect to the UE at the middle location in the current interference measurement area, 0 is used as the area scheduling pattern of the UE at the middle location of the current interference measurement area, that is, the scheduling of the UE at the middle location is not actively adjusted.

So far, the area scheduling pattern of each interference measurement area, e.g., the area scheduling pattern of the UE at the central location, the area scheduling pattern of the UE at the middle location and the area scheduling pattern of the UE at the edge location, may be determined.

Referring back to FIG. 13, at operation S1320, scheduling adjustment weight values of each UE are determined based on the location of each UE and the area scheduling pattern of an interference measurement area to which the UE belongs. Specifically, before performing operation S1320, the location of each UE and the interference measurement area to which it belongs need to be determined.

Figure 18:
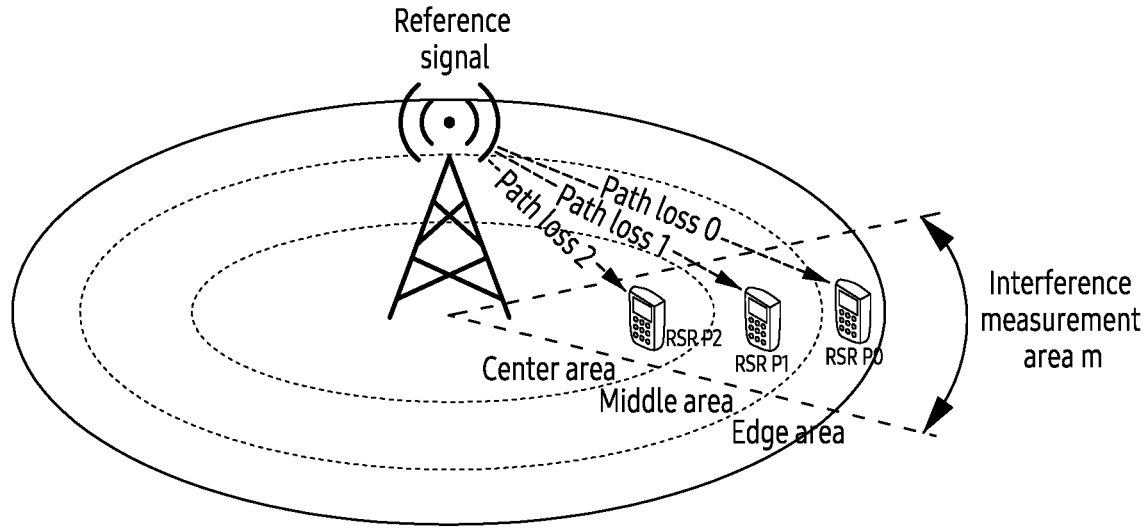
FIG. 18 is a schematic diagram illustrating a process of determining a location of each UE in a current cell and an interference measurement area to which the UE belongs, according to an embodiment of the disclosure.

FIG. 18 is a schematic diagram illustrating a process of determining a location of each UE in a current cell and an interference measurement area to which the UE belongs, according to an embodiment of the disclosure.

Referring to FIG. 18, firstly, a path loss, Reference Signal Received Power (RSRP) or Signal to Interference & Noise Ratio (SINR) of each UE in the current cell may be acquired. Then, all UEs in the current cell may be divided into UEs at different locations, for example, UEs at the edge location of the cell, UEs at the middle location of the cell, and UEs at the central location of the cell, based on the acquired path loss, RSRP or SINR of each UE. Since values of the RSRP and path loss may reflect a distance between a UE and the current base station, that is, if the RSRP is smaller and the path loss is larger, the UE is farther away from the current base station, and if the RSRP is larger and the path loss is smaller, the UE is closer to the current base station. Therefore, all UEs in the current cell may be divided into UEs at the edge location of the cell, UEs at the middle location of the cell and UEs at the center location of the cell, accordingly, wherein, the number of the UEs at the edge location of the cell and the number of the UEs at the central location of the cell may be approximately the same. However, the disclosure is not limited to this, and all UEs within the current cell may be divided into UEs at more locations or fewer locations, for example, all UEs within the current cell may be only divided into UEs at the center location of the cell and UEs at the edge location of the cell. Finally, the interference measurement area to which each UE belongs is determined based on a horizontal arrival angle of signal of each UE.

Operation S1320 is described in detail below with reference to FIG. 19.

FIG. 19 is a flowchart illustrating a process of determining scheduling adjustment weight values of each UE based on a location of each UE and an area scheduling pattern of the interference measurement area to which the UE belongs according to an embodiment of the disclosure.

Referring to FIG. 19, at operation S1910, an area scheduling pattern corresponding to a location of the current UE may be selected from among the area scheduling pattern of the interference measurement area to which the current UE belongs, according to the location of the current UE.

Specifically, for example, assuming that the current UE is the UE at the edge location of the cell, since the area scheduling pattern of each interference measurement area has been previously determined according to operation S1310 (e.g., the area scheduling pattern of the UE at the central location, the area scheduling pattern of the UE at the middle location and the area scheduling pattern of the UE at the edge location of each interference measurement area), the area scheduling pattern corresponding to the location of the current UE may be selected from among the area scheduling pattern of the interference measurement area to which the current UE belongs, according to the location of the current UE, that is, selecting the area scheduling pattern of the UE at the edge location, for example, the area scheduling pattern of the UE at the edge location [0.4, −1.3, 1.6, −0.7] mentioned above in operation S1530.

At operation S1920, the scheduling adjustment weight values of the current UE may be determined according to an impact factor Q and the selected area scheduling pattern.

The impact factor Q may be used to determine a magnitude of the impact of the scheme proposed in the disclosure on an actual system. When an interference power of different time units (e.g., different time slots) of a communication network varies widely, an effect of adjusting the scheduling priorities of the UE at the edge location and the UE at the central location in different time units are better, and the impact factor Q may be set larger at this time, in order to obtain a more appropriate impact factor Q to obtain the highest throughput. Therefore, in the disclosure, an average throughput of the current base station may be counted according to a third period P3, and then the impact factor Q is adjusted in positive correlation with this average throughput.

Figure 20:
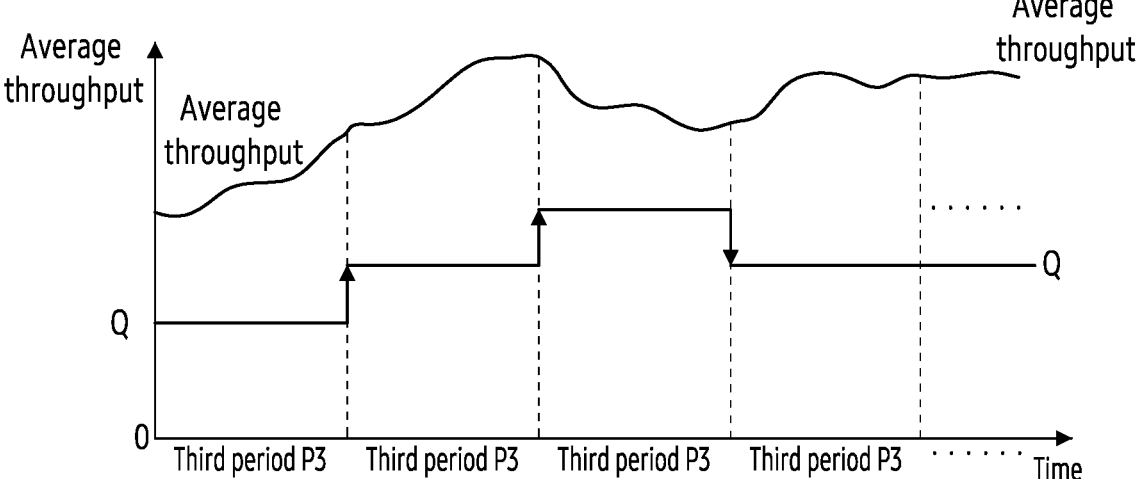
FIG. 20 is a schematic diagram illustrating a process of adjusting an impact factor according to an embodiment of the disclosure.

FIG. 20 is a schematic diagram illustrating a process of adjusting an impact factor according to an embodiment of the disclosure.

Referring to FIG. 20, firstly, an initial value of the impact factor Q is set, the impact factor Q is increased, and then average throughput in one third period P3 is counted. If the average throughput in this third period P3 increases, the impact factor Q is increased at the beginning of the next third period P3. If the average throughput within that third period P3 decreases, the impact factor Q is adjusted in reverse until an optimal impact factor Q is obtained. Wherein the third period P3 is typically larger than the first period P1, which may be, for example, one week, two weeks, etc.

In the disclosure, a scheduling adjustment weight value of one UE may be obtained by multiplying the area scheduling pattern of this UE with the current impact factor Q. For example, if the area scheduling pattern selected for this UE is the area scheduling pattern of the UE at the edge location (e.g., [0.4, −1.3, 1.6, −0.7]), the scheduling adjustment weight value of this UE is [0.4, −1.3, 1.6, −0.7]*Q=[0.4Q, −1.3Q, 1.6Q, −0.7Q], and if the area scheduling pattern selected for this UE is the area scheduling pattern of the UE at the central location (e.g., [0, 0, 0, 0]), the scheduling adjustment weight value of this UE is [0, 0, 0, 0]*Q=[0, 0, 0, 0], and if the area scheduling pattern selected for this UE is the area scheduling pattern of the UE at the central location (e.g. [−0.4, 1.3, −1.6, 0.7]), the scheduling adjustment weight of this UE is [−0.4, 1.3, −1.6, 0.7]*Q=[−0.4Q, 1.3Q, −1.6Q, 0.7Q].

Referring back to FIG. 13, at operation S1330, an initial scheduling priority of each UE at each time unit may be adjusted according to the scheduling adjustment weight values of each UE, to determine the scheduling priorities of each UE at different time units, thereby avoiding interference.

Specifically, firstly, an initial scheduling priority of one UE waiting to be scheduled at each time unit may be calculated for this UE according to a general method, and then the scheduling adjustment weight values of this UE are used to adjust the initial scheduling priority of this UE at each time unit, for example, the scheduling adjustment weight values of this UE are added to the initial scheduling priorities of this UE at the corresponding time units to obtain the scheduling priorities of this UE on each time unit, i.e., the enhanced scheduling priorities.

FIG. 21A illustrates a process of determining the scheduling priorities of the UE at the edge location, the UE at the middle location, and the UE at the central location in an interference measurement area according to an embodiment of the disclosure.

Referring to FIG. 21A, in this interference measurement area, the scheduling adjustment weight values of the UE at the edge location are [0.4Q, −1.3Q, 1.6Q, −0.7Q], the scheduling adjustment weight values of the UE at the central location are [−0.4Q, 1.3Q, −1.6Q, 0.7Q], and the scheduling adjustment weight values of the UE at the middle location are [0, 0, 0, 0], the initial scheduling priorities of the UE at the edge location at four time units are [PEdge0, PEdge1, PEdge2, PEdge3], the initial scheduling priorities of the UE at the middle location at the four time units are [PMe0, PMe1, PMe2, PMe3], and the initial scheduling priorities of the UE at the central location at the four time units are [PCe0, PCe1, PCe2, PCe3], and the scheduling adjustment weight values of this UE are added to the initial scheduling priorities of this UE at the corresponding time units, thereby obtaining the scheduling priorities of this UE on each time unit shown at the bottom of FIG. 21A, i.e., the enhanced scheduling priorities. Further, in the disclosure, the initial scheduling priority may be, for example, a proportional fair (PF) priority, however, the disclosure is not limited thereto.

Through the process of FIG. 13, the enhanced scheduling priorities of each UE within the current cell at each time unit may be determined. The disclosure obtains the enhanced scheduling priorities of the UE by adjusting the initial scheduling priorities of the UE based on the scheduling adjustment weight values of the UE, thus achieving a goal of using a higher priority to schedule the UE at the edge location in a low-interference time unit and to schedule the UE at the central location in a high-interference time unit.

In order to better understand the process of determining the area interference pattern, the area scheduling pattern, the scheduling adjustment weight value, and the scheduling priority, a summary is described below with reference to FIG. 21B.

Figure 21B:
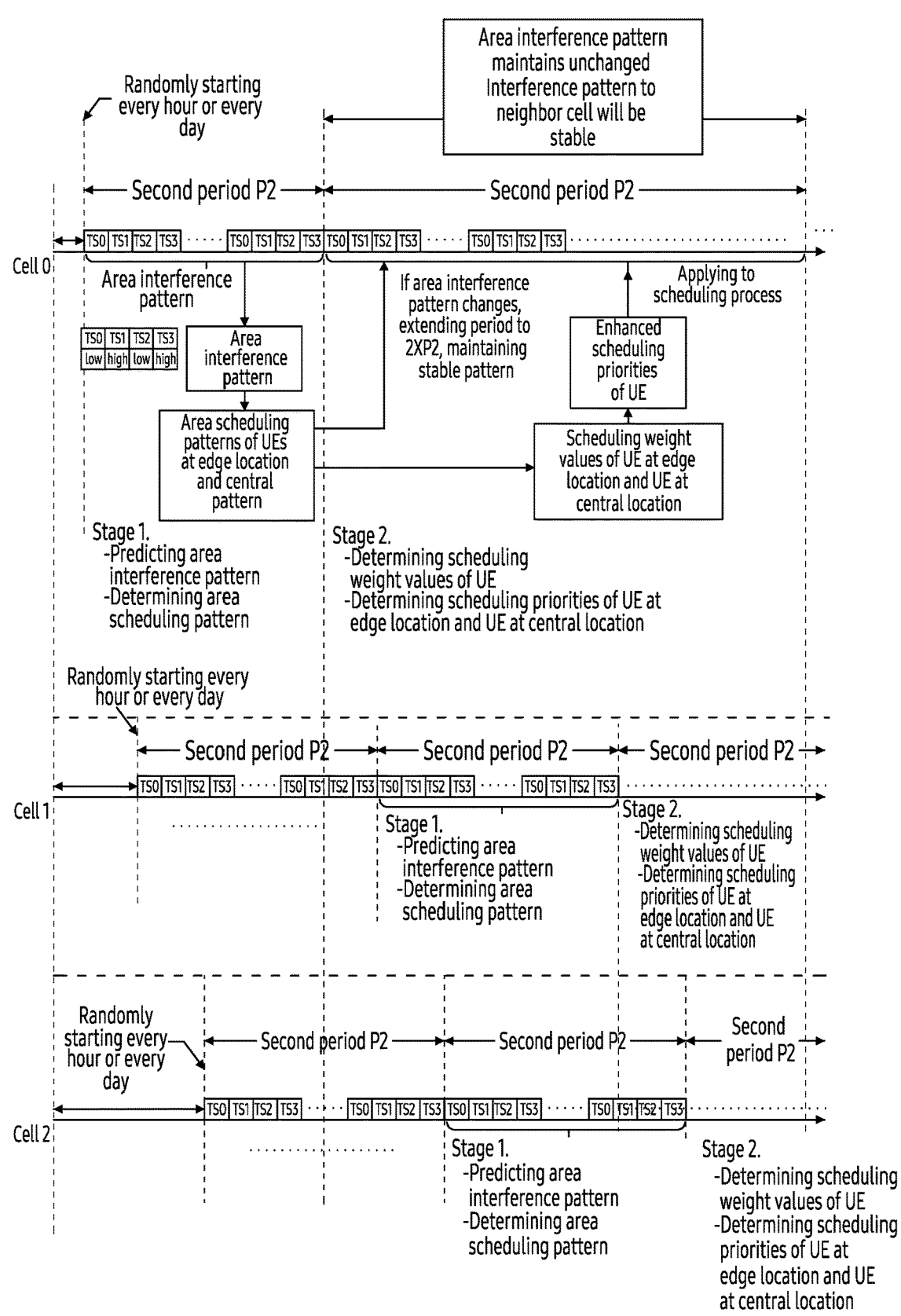
FIG. 21B is a schematic diagram illustrating a process of determining an area interference pattern, an area scheduling pattern, a scheduling adjustment weight value, and a scheduling priority, according to an embodiment of the disclosure.

FIG. 21B is a schematic diagram illustrating the process of determining an area interference pattern, an area scheduling pattern, a scheduling adjustment weight value, and a scheduling priority according to an embodiment of the disclosure. A total of three cells are illustrated in FIG. 21B.

Referring to FIG. 21B, for cell 0, a second period (e.g., 1 hour or 1 day) may be randomly started to divide cell 0 into a plurality of interference measurement areas. In a first second period P2, firstly, interference information (e.g., area interference pattern) about interference suffered by each interference measurement area is determined, and then, an area scheduling pattern of each interference measurement area is determined (e.g., an area scheduling pattern of a UE at a central location, an area scheduling pattern of a UE at a middle location and an area scheduling pattern of a UE at an edge location of each interference measurement area). When an area interference pattern of a certain interference measurement area changes, in order to maintain stable interference and scheduling patterns, to avoid inaccurate prediction of area interference patterns due to simultaneous modification of area interference patterns and/or area scheduling patterns by a plurality of cells, a next operation to determine the area interference pattern of this interference measurement area needs to be extended to 2×second period P2. Therefore, for this interference measurement area, within this 2×second period P2, scheduling adjustment weight values of each UE (e.g., the respective scheduling weight values of the UE at the edge location, the UE at the central location, and the UE at the middle location) are firstly determined based on the area scheduling pattern selected for each UE, and thereafter, initial scheduling priorities of each UE at each time unit (e.g., initial PF priorities) are adjusted based on the scheduling adjustment weight values of each UE, to determine scheduling priorities of each UE at each time unit (i.e., enhanced scheduling priorities). Finally, the determined scheduling priority for each UE at each time unit may be applied to the scheduling process.

For cells 1 and 2, processes are similar to that of cell 0, with a difference that the area interference pattern of each interference measurement area is not changed, and therefore the next operation to determine the area interference pattern/scheduling pattern of this interference measurement area is not extended to 2×second period P2.

Referring back to FIG. 2, at operation S230, UEs in the current cell are scheduled according to the determined scheduling priorities.

The operation S230 may include: determining available resources for a current cell at a current time unit; allocating resources to UEs in the current cell in a descending order of the scheduling priorities of all UEs in the current cell under the current time unit.

Specifically, step (1): remaining available resources for the current cell at the current time unit (e.g., the current time slot) may be queried. Wherein, a starting PRB location for allocating resources may be 0, or the starting PRB location for allocating resources may be determined according to a PRB randomization scheme. If there are the remaining available resources, the following step (2) is performed.

Step (2): an amount of data to be transmitted/received may be determined. Specifically, the amount of data to be transmitted/received of the UE with the highest scheduling priority among UEs that have not yet been allocated resources under the current time unit may be determined, in the descending order of the scheduling priorities of UEs within the current cell under the current time unit.

Step (3): resources required for the UE with the highest scheduling priority may be calculated based on the amount of data to be transmitted/received of this UE and a modulation coding scheme available by this UE.

Step (4): maximum required resources may be allocated for this UE within the remaining available resources of the current cell at the current time unit, from the previously determined starting PRB location.

Step (5): If there still are the remaining available resources for the current cell under the current time unit, the performing may start again from step (2) with respect to a next UE in descending order of scheduling priorities of all UEs in the current cell under the current time unit.

If it is found that there are no remaining available resources for the current cell at the current time unit in step (1) or step (5) above, the process of allocating resources to UEs with respect to the current time unit ends, and then reallocating resources to the UE in the current cell starts again from step (1) with respect to a next time unit.

In the above description, the utilized AI model is trained model. The training process of the AI model will be described in detail below with reference to FIG. 22.

FIG. 22 is a flowchart illustrating a process of training an AI model according to an embodiment of the disclosure.

Referring to FIG. 22, at operation S2210, an interference power sequence may be collected by performing interference management on a current base station through a plurality of predetermined area interference patterns, with respect to each of a plurality of time periods.

Specifically, a 5G system is at millisecond level, and resource scheduling is also at millisecond level. However, user service is at tens of seconds level. According to actual network statistics, an average talk time for voice is 88.31 seconds and an average duration of data service is 21.25 seconds. Therefore, it may be assumed that interference caused by the service does not change quickly and may maintain stable for a short period of time, compared to millisecond level of resource scheduling, i.e., an area interference pattern is assumed to maintain stable for one time period (e.g., 18 seconds). For ease of description, one time period of 18 seconds is used as an example in the following description.

In order to make the trained AI model sufficiently accurate, the interference power sequence need to be collected over a longer data collection time (e.g., 1 day or 1 week) as training data. The collected interference power sequence may include both uplink interference data and downlink interference data. The uplink interference data may be uplink interference data measured by a base station using different receiving beams corresponding to each interference measurement area to receive signals. The downlink interference data may be calculated by the base station from a RSRP and SINR reported by a UE. In addition, the base station determines an interference measurement area where the UE is located, by detecting a horizontal arrival angle of a signal of the UE.

Assuming that there are four time units (e.g., time slots) in each radio frame, there are a total of 18 predefined area interference patterns (pattern 0~pattern 17) as shown in FIG. 11. Therefore, one different predefined area interference pattern is used for each second of the 18 seconds, respectively, to perform manage interference on the current base station, and the interference power sequence in this predefined area interference pattern is collected in the meantime.

At operation S2220, for each time period, the interference power sequence collected within a current time period is marked, according to one predetermined area interference pattern in which a maximum average throughput is obtained within the current time period during the interference management.

Specifically, for example, within an 18-second period, if the average throughput is greatest when the interference management is performed on an actual network using the pattern 16 as shown in FIG. 11, the pattern 16 is selected as the optimal area interference pattern within this 18-second period, and then all interference power sequences collected during this 18-second period is marked using the pattern 16, that is, all interference power sequences collected during this 18-second period are labeled. According to a similar manner, a plurality of marked interference power sequences may be obtained by collecting the interference power sequences over a longer data collection time period (e.g., 1 day or 1 week) in one time period of 18 seconds and marking the collected interference power sequences using the corresponding optimal area interference pattern, wherein each marked interference power sequence contains an interference power sequence and a corresponding label (i.e., the corresponding optimal area interference pattern).

At operation S2230, the AI model may be trained by using the plurality of labeled interference power sequences.

Specifically, an interference power sequence among the plurality of labeled interference power sequences and its corresponding label (i.e., the corresponding optimal area interference pattern) are input to the AI model to complete the training of the AI model.

In addition, since each base station is in a different interference environment, the AI model used for each base station needs to be trained separately. In addition, the training of the AI model may be performed on the network node performing the present method, or the AI model may be trained outside of that network node and then the trained AI model may be transmitted to this network node, to save the resources of this network node. The AI model of which the training is completed may be used to predict the area interference pattern of the interference measurement area and the area interference pattern of the unit area described above. However, since it takes a long time to train the AI model before application, in order to enable the network node, when being started, to apply the method of the disclosure as soon as possible, the rule-based non-AI method described above may be used to predict the area interference pattern of each interference measurement area and the area interference pattern of the unit area before obtaining the training data for the AI model.

In order to make those skilled in the art more clearly understand the process of the method proposed in the disclosure, the process of the method will be described in general with reference to FIG. 23 below.

Figure 23:
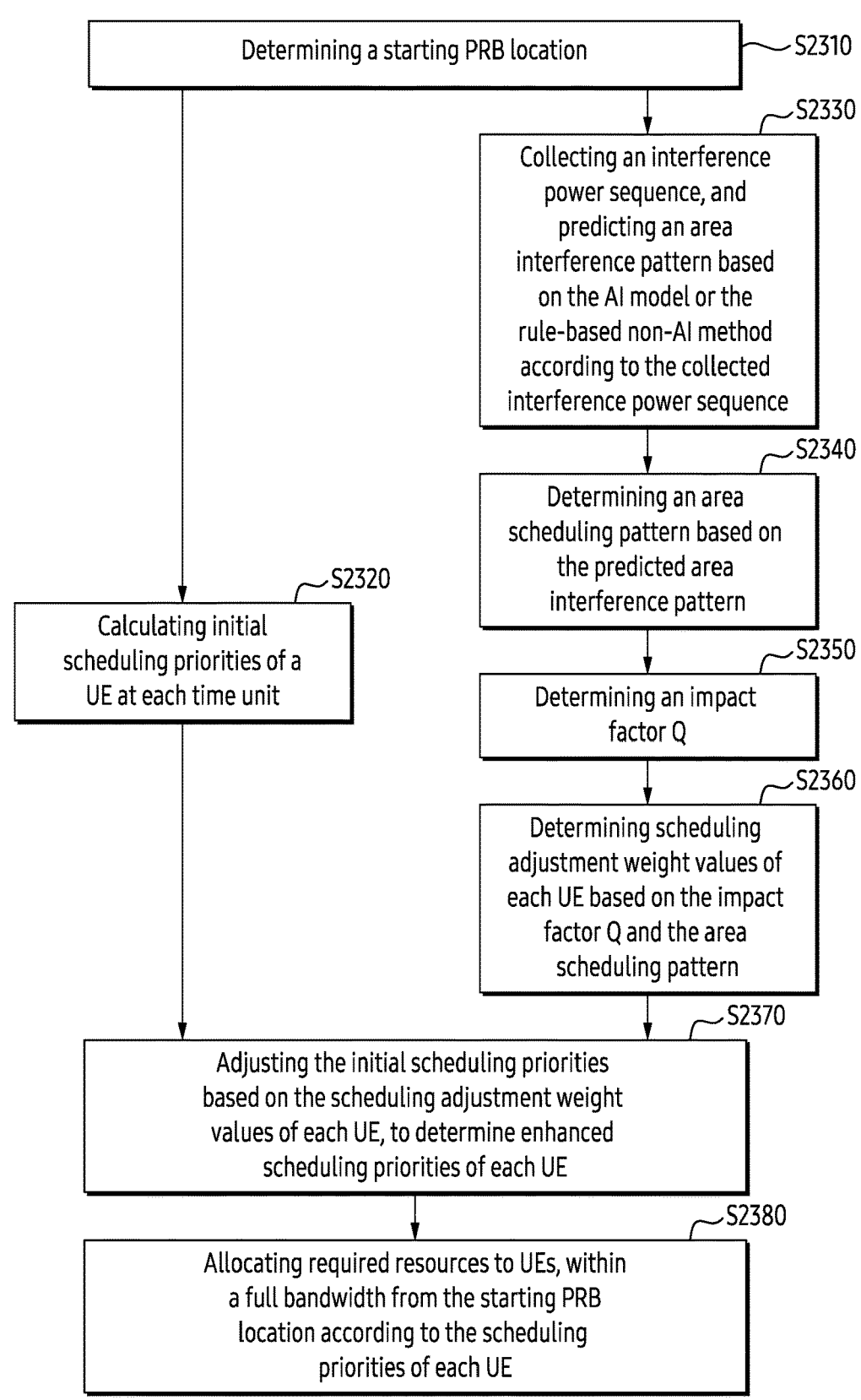
FIG. 23 is an example flowchart illustrating a method performed by a network node according to an embodiment of the disclosure.

FIG. 23 is an example flowchart illustrating a method performed by a network node according to an embodiment of the disclosure.

First, at operation S2310, a starting PRB location may be determined, wherein the starting PRB location may be 0, or the starting PRB location for allocating resources may be determined based on a PRB randomization scheme.

At operation S2320, for a UE waiting to be scheduled, initial scheduling priorities of this UE at each time unit may be calculated according to a general method.

At operation S2330, an interference power sequence of a previous second may be is collected with respect to each interference measurement area, and an area interference pattern of each interference measurement area at a current second period is predicted based on the AI model or the rule-based non-AI method described above, according to interference power sequence of the previous second period collected for each interference measurement area.

At operation S2340, an area scheduling pattern of each interference measurement area at the current second period may be determined based on the predicted area interference pattern of each interference measurement area at the current second period.

At operation S2350, an impact factor Q is determined, wherein the impact factor Q may be adjusted in positive correlation with an average throughput calculated according to a third period, which has been described in detail above at operation S1820 with reference to FIG. 20 and will not be repeated here.

At operation S2360, scheduling adjustment weight values of each UE may be determined based on the impact factor Q and the area scheduling pattern of each UE.

At operation S2370, the initial scheduling priorities of each UE on each time unit may be adjusted based on the scheduling adjustment weight values of each UE, to determine a scheduling priority of each UE on each time unit.

At operation S2380, required resources may be allocated to UEs, within a full bandwidth from the starting PRB location, according to the scheduling priority of each UE in the current cell at each time unit.

Furthermore, although the operations of FIG. 23 are described in a certain order, some of the operations in FIG. 23 may be performed simultaneously, and the order of some operations may be changed, for example, operation S2310 may be performed at any moment before operations S2380 and S2320 may be performed at any moment before operation S2370.

Figure 24:
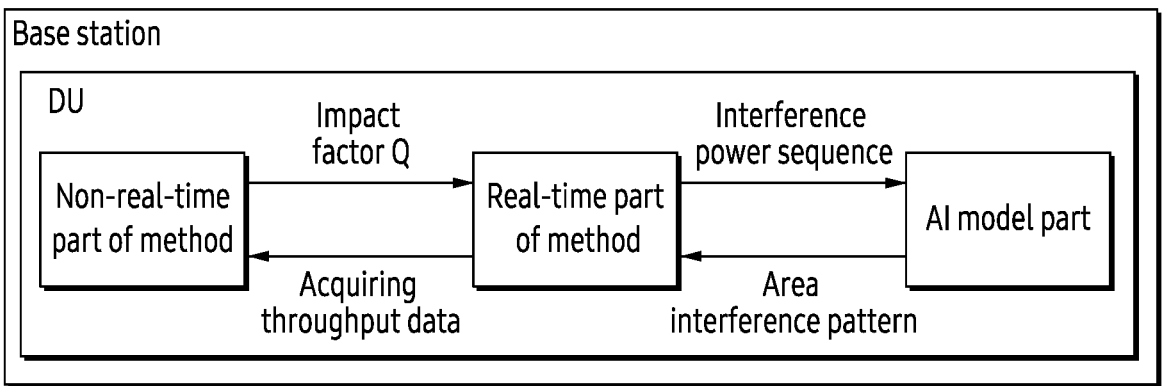
FIG. 24 illustrates a diagram of a deployment scenario of a method according to an embodiment of the disclosure.

FIG. 24 is a diagram illustrating a deployment scenario of a method according to an embodiment of the disclosure. The base station according to embodiments of the disclosure may be implemented with a distributed deployment according to a centralized unit (CU) configured to perform a function of upper layers (e.g., packet data convergence protocol (PDCP), radio resource control (RRC)) of an access network, and a distributed unit (DU) configured to perform a function of a lower layer. Between the core (e.g., 5G core (5GC) or next generation core (NGC)) network and the radio network (RAN), the deployment of the base station may be implemented in the order of CU, DU, and a radio unit (RU). The interface between the CU and DU may be referred to as an F1 interface.

The CU may be connected to one or more DUs to act as a higher layer than the DU. For example, the CU may be responsible for the functions of radio resource control (RRC) and packet data convergence protocol (PDCP) layers, and the DU and the RU may be responsible for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the distributed unit (DU) according to implementation of a distributed arrangement of the base station. Hereinafter, unless otherwise defined, the operations of the DU will be described, but it is to be noted that various embodiments of the disclosure may be applied to both a base station deployment including the CU or a deployment in which the DU is directly connected to a core network, that is, being incorporated into a base station (e.g., an NG-RAN node) where the CU and the DU are one entity.

Referring to FIG. 24, when a network node performing the method of the disclosure is a base station, the method of the disclosure may be implemented and deployed in a Medium Access Control (MAC) module of a Distribution Unit (DU) of the base station, and in addition, the method of the disclosure may be divided into a non-real-time part of the method and a real-time part of the method, which are implemented in the MAC module of the DU as follows The non-real-time part of the method is responsible for the following operations:

(1) At the beginning of the method of the disclosure, an initial impact factor Q is set to the real-time part of the method.

(2) Throughput data is acquired from the real-time part of the method, and the impact factor Q is adjusted in a third period P3 (e.g., 1 week), and the adjusted impact factor Q is updated to the real-time part of the method. Finally, an optimal impact factor Q is obtained by continuously adjusting the impact factor Q based on the acquired throughput data, and this optimal impact factor Q is updated to the real-time part of the method.

The real-time part of the method is responsible for the following operations:

(1) A cell is divided into a plurality of interference measurement areas, and an area interference pattern of each interference measurement area at a current second period is predicted by a rule-based non-AI method based on an interference power sequence of each interference measurement area at different time units in a previous second period (e.g., 200 ms).

(2) An area scheduling pattern of each interference measurement area is determined based on the predicted interference information (e.g., area interference pattern) of each interference measurement area.

(3) Scheduling adjustment weight values of each UE used to adjust initial scheduling priorities is determined according to the impact factor Q, a location of each UE, and the area scheduling pattern of the interference measurement area to which each UE belongs.

(4) The initial scheduling priorities of each UE on each time unit are adjusted based on the scheduling adjustment weight values of each UE, to determine the scheduling priorities of each UE on each time unit (i.e., enhanced scheduling priorities).

(5) Resources are allocated to UEs in the current cell according to the scheduling priorities of each UE on each time unit (i.e., enhanced scheduling priorities).

In addition, if the method of the disclosure further applies the AI model described above, the method further comprises an AI model part that may be deployed in the MAC module of the DU, and this AI model part is responsible for: intelligently predicting the area interference pattern of each interference measurement area at the current second period by using historical interference information of each interference measurement area (e.g., interference power sequence collected for each interference measurement area at the previous second period (e.g., 200 ms)).

Figure 25:
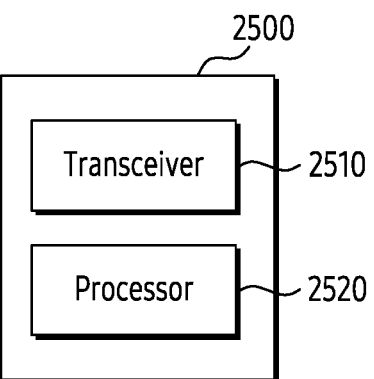
FIG. 25 is a block diagram illustrating a network node according to an embodiment of the disclosure.

FIG. 25 is a block diagram illustrating a network node according to an embodiment of the disclosure.

Referring to FIG. 25, the network node 2500 includes a transceiver 2510 and a processor 2520, wherein the processor 2520 is coupled with the transceiver 2510 and is configured to perform the method performed by the network node described above with reference to FIGS. 2, 3A, 3B, 4 to 13, 14A, 14B, 15 to 20, 21A, 21B, 22, and 23. Details of the operations of the methods performed by the network node described above may be found described with reference to FIGS. 2, 3A, 3B, 4 to 13, 14A, 14B, 15 to 20, 21A, 21B, 22, and 23, all of which are not repeated herein.

The technical solution provided by the embodiments of the disclosure dynamically predicts high, medium and low interference intensity of each interference measurement area at different time units in a next period based on historical interference information, so at to adjust the scheduling priorities of UEs at different locations (e.g., UE at the edge location and UE at the central location), so that time units with relatively low interference may be assigned to UEs at the edge location sensitive to interference, and time units with relatively high interference may be assigned to the UE at the central locations with stronger interference resistance, thereby avoiding interference as actively as possible and reducing the impact of interference even under high loads.

Specifically, when scheduling data in a time unit with low interference, the UEs at the edge location may be scheduled preferentially by increasing scheduling priorities of the UEs at the edge location, and since channel qualities of the UEs at the edge location are poor, avoiding interference may improve a signal quality and modulation coding scheme, thus increasing the throughput. Meanwhile, when scheduling data in a time unit with high interference, the UEs at the central location are scheduled preferentially by increasing scheduling priorities of the UEs at the central location, and since the channel qualities of the UEs at the central location are good and the UEs at the central location are far from the interference of adjacent cells, the UEs have a better anti-interference capability and the throughput is unaffected or less affected. In addition, resources may be allocated for UEs in a full frequency band by using the method of the disclosure.

The above describes a method performed by a network node and the corresponding network node of the disclosure, respectively, and the following is a comparison with the related art in terms of effect when applying the method.

Figure 26A:
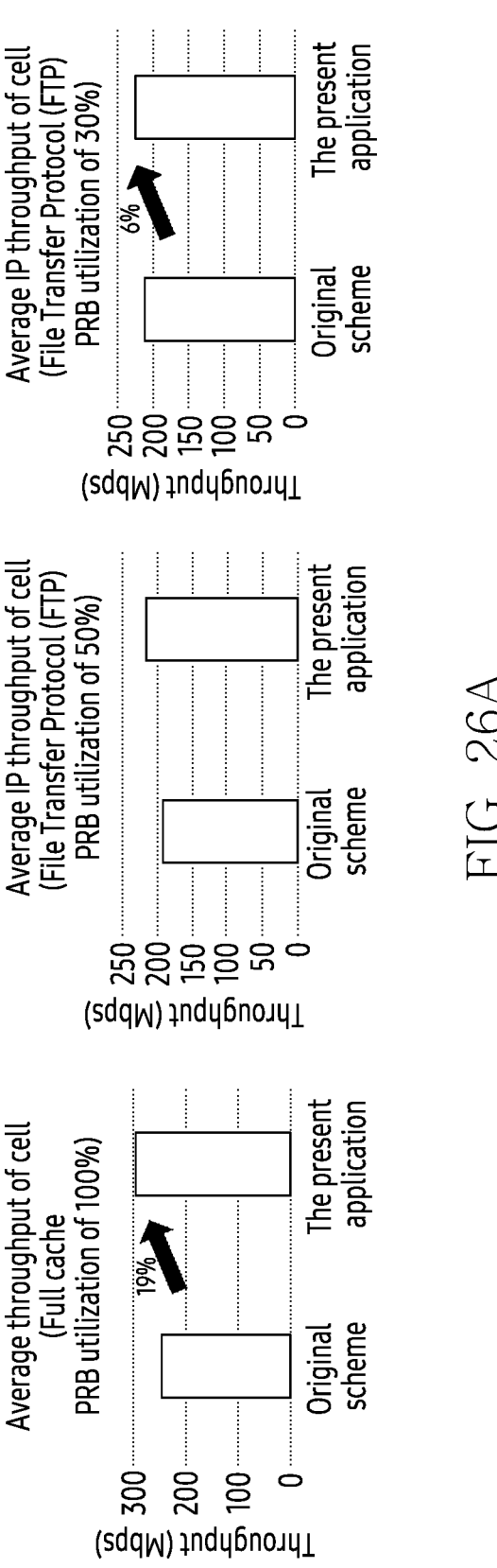
FIGS. 26A and 26B are diagrams illustrating a comparison between a method of the disclosure and an original Physical Resource Block (PRB) interference random optimization scheme (hereinafter, referred to as an original scheme) according to various embodiments of the disclosure.
Figure 26B:
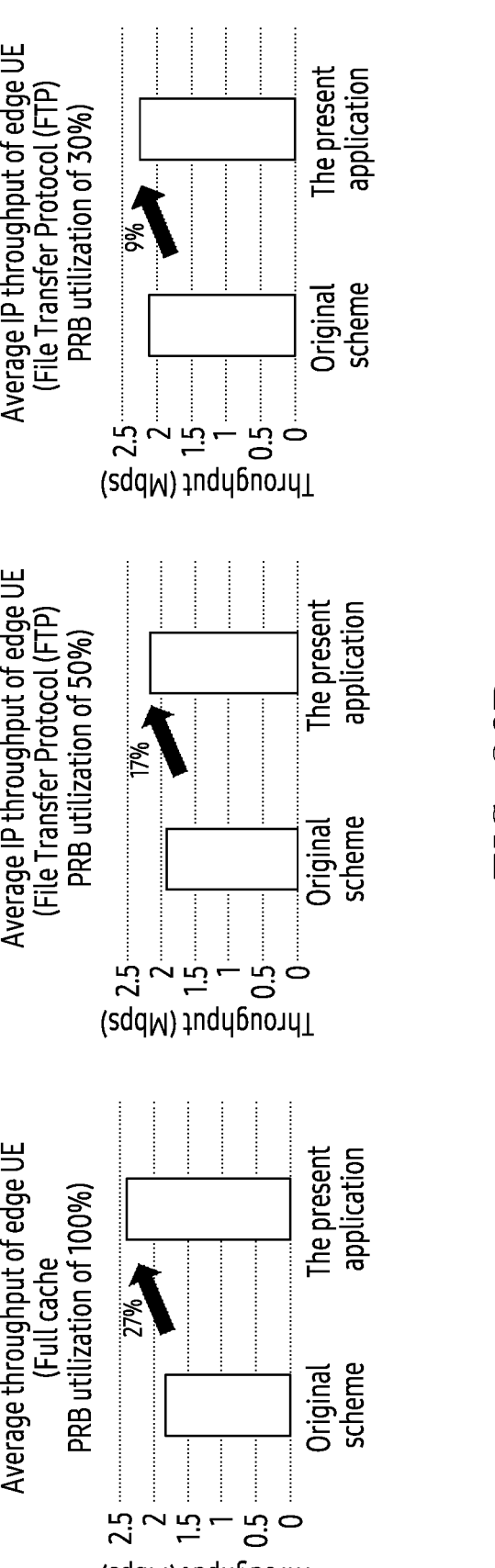

FIGS. 26A and 26B are schematic diagrams showing a comparison between the method of the disclosure and an original PRB interference random optimization scheme (hereinafter, becoming an original scheme) according to various embodiments of the disclosure.

Referring to FIG. 26A, compared to the original scheme, the method of the disclosure may improve an average throughput of a cell by about 19% in a case of a PRB utilization of 100%, the method of the disclosure may improve an average physical layer (IP) throughput of the cell by about 19% in a case of a PRB utilization of 50%, and the method of the disclosure may improve the average physical layer (IP) throughput of the cell by about 6% in a case of a PRB utilization of 30%.

Referring to FIG. 26B, with respect to the original scheme, the method of the disclosure may improve the average throughput of a UE at the cell edge by about 27% in a case of a PRB utilization of 100%, the method of the disclosure may improve the average IP throughput of the UE at the cell edge by about 17% in a case of a PRB utilization of 50%, and the method of the disclosure may improve the average IP throughput of the UE at the cell edge by about 9% in a case of a PRB utilization of 30%.

As seen, the method of the disclosure improves the throughput of the UE at the edge location through intelligent network interference management, and also improves the overall throughput of the network and enhances spectrum efficiency.

Further, according to embodiments of the disclosure, there may be provided an electronic apparatus including: at least one processor; and at least one memory storing computer executable instructions, wherein the computer-executable instructions, when being executed by the at least one processor, cause the at least one processor to perform the method as described above performed by the network node.

According to embodiments, a method performed by a network node, comprises predicting interference information about interference suffered by a current cell, determining scheduling priorities of respective user equipment (UE) at different time units according to the predicted interference information and locations of the UEs in the current cell, and scheduling UEs in the current cell according to the determined scheduling priorities.

According to an embodiment, the predicting the interference information about the interference suffered by the current cell comprises dividing the current cell into a plurality of interference measurement areas. The predicting the interference information about the interference suffered by the current cell comprises predicting interference information about interference suffered by each interference measurement area.

According to an embodiment, the dividing the current cell into the plurality of interference measurement areas comprises dividing the current cell into a plurality of unit areas with a current base station as the center. The dividing the current cell into the plurality of interference measurement areas comprises determining an area interference pattern for each of the plurality of unit areas. The dividing the current cell into the plurality of interference measurement areas comprises grouping the plurality of unit areas, according to area interference pattern sequence correlations between unit areas of the plurality of unit areas, to determine the plurality of interference measurement areas.

According to an embodiment, the determining the plurality of interference measurement areas comprises determining a first unit area as a pending interference measurement area. The determining the plurality of interference measurement areas comprises, with respect to the pending interference measurement area, performing an operation of determining the area interference pattern sequence correlation. The operation of determining the area interference pattern sequence correlation is used to determine the area interference pattern sequence correlation between each unit area in the pending interference measurement area and a next unit area adjacent to the pending interference measurement area in a predetermined direction. The determining the plurality of interference measurement areas comprises, if a minimum value among the area interference pattern sequence correlations between the next unit area and each unit area in the pending interference measurement area is greater than a first predetermined threshold, grouping the next unit area to the pending interference measurement area, and performing the operation of determining the area interference pattern sequence correlation with respect to the pending interference measurement area at this time. The determining the plurality of interference measurement areas comprises, if the minimum value among the area interference pattern sequence correlations between the next unit area and each unit area in the pending interference measurement area is not greater than the first predetermined threshold, determining the pending interference measurement area as a final interference measurement area, determining the next unit area as a new pending interference measurement area, and performing the operation of determining the area interference pattern sequence correlation with respect to the pending interference measurement area at this time.

According to an embodiment, the dividing the current cell into the plurality of interference measurement areas is performed at a beginning of each first period. Two consecutive first periods are spaced with separate random time.

According to an embodiment, the predicting the interference information about interference suffered by each interference measurement area comprises predicting an area interference pattern of a current interference measurement area at a current second period according to historical interference information of the current interference measurement area, wherein the area interference pattern represents a coding combination of an intensity of an intra-frequency interference of adjacent cells suffered by one area at respective time unit within a predetermined time.

According to an embodiment, the predicting the area interference pattern of the current interference measurement area at the current second period according to the historical interference information of the current interference measurement area comprises predicting the area interference pattern of the current interference measurement area at the current second period using the historical interference information of the current interference measurement area through an artificial intelligence (AI) model.

According to an embodiment, the predicting the area interference pattern of the current interference measurement area at the current second period according to the historical interference information of the current interference measurement area comprises determining one interference power matrix of the plurality of interference measurement areas, according to an interference power of each time unit in a previous second period collected at each interference measurement area. The predicting the area interference pattern of the current interference measurement area at the current second period according to the historical interference information of the current interference measurement area comprises selecting one area interference pattern matrix from an area interference pattern table including at least one area interference pattern matrix according to serial numbers of time units within the current second period. The predicting the area interference pattern of the current interference measurement area at the current second period according to the historical interference information of the current interference measurement area comprises predicting the area interference pattern of the current interference measurement area at the current second period according to the interference power matrix and the area interference pattern matrix.

According to an embodiment, the determining the one interference power matrix of the plurality of interference measurement areas, according to the interference power of each time unit in the previous second period collected at each interference measurement area comprises: performing the following operations with respect to each interference measurement area by averaging interference powers of time units with a same serial number in a previous second period with respect to the current interference measurement area, obtaining an average interference power of the current interference measurement area at the time units of the previous second period, filtering the average interference power, based on a historical filtered interference power of the current interference measurement area at the time units, to obtain a filtered interference power of the current interference measurement area at the time units of the previous second period, and setting the filtered interference power as the interference power of the current interference measurement area at the time units in the interference power matrix.

According to an embodiment, the historical filtered interference power of the current interference measurement area at the time units is updated as the filtered interference power of the current interference measurement area at the time units of the previous second period.

According to an embodiment, the predicting the area interference pattern of the current interference measurement area at the current second period according to the interference power matrix and the area interference pattern matrix comprises determining a result matrix based on the interference power matrix and the area interference pattern matrix. The predicting the area interference pattern of the current interference measurement area at the current second period according to the interference power matrix and the area interference pattern matrix comprises determining a maximum value among a plurality of matrix elements corresponding to the current interference measurement area from among the result matrix. The predicting the area interference pattern of the current interference measurement area at the current second period according to the interference power matrix and the area interference pattern matrix comprises determining an area interference pattern corresponding to the maximum value in the area interference pattern matrix as the area interference pattern of the current interference measurement area at the current second period.

According to an embodiment, the determining the scheduling priorities of the respective UE at different time units based on the predicted interference information and the locations of the UEs in the current cell comprises determining an area scheduling pattern of each interference measurement area based on the predicted interference information of each interference measurement area, wherein the area scheduling pattern represents a set of weight values for adjusting scheduling priorities of UEs, at different locations within the current interference measurement area, at different time units. The determining the scheduling priorities of the respective UE at different time units based on the predicted interference information and the locations of the UEs in the current cell comprises determining scheduling adjustment weight values of each UE based on a location of each UE and the area scheduling pattern of an interference measurement area to which the UE belongs. The determining the scheduling priorities of the respective UE at different time units based on the predicted interference information and the locations of the UEs in the current cell comprises adjusting an initial scheduling priority of each UE at each time unit according to the scheduling adjustment weight values of each UE, to determine the scheduling priorities of each UE at different time units.

According to an embodiment, the determining the area scheduling pattern of each interference measurement area based on the predicted interference information of each interference measurement area comprises determining an interference mean deviation weight of time units with the same serial number within a current second period The determining the area scheduling pattern of each interference measurement area based on the predicted interference information of each interference measurement area comprises determining a standard area scheduling pattern of each interference measurement area according to the interference mean deviation weight of the time units with the same serial number and an area interference pattern of each interference measurement area. The determining the area scheduling pattern of each interference measurement area based on the predicted interference information of each interference measurement area comprises determining area scheduling patterns of UEs at different locations in each interference area according to the standard area scheduling pattern of each interference measurement area.

According to an embodiment, the area scheduling patterns of UEs at different locations comprises at least one of an area scheduling pattern of a UE at a central location, an area scheduling pattern of a UE at a middle location, or an area scheduling pattern of a UE at an edge location.

According to an embodiment, the determining the interference mean deviation weight of time units with the same serial number within the current second period comprises determining an average interference power of the time units with the same serial number within the current second period and an average value of interference powers of all time units within the current second period. determining the interference mean deviation weight of time units with the same serial number within the current second period comprises calculating an absolute difference between the average interference power of the time units with the same serial number and the average value. The determining the interference mean deviation weight of time units with the same serial number within the current second period comprises determining the interference mean deviation weight of the time units with the same serial number according to the absolute difference of the time units with the same serial number.

According to an embodiment, the determining the scheduling adjustment weight values of each UE based on the location of each UE and the area scheduling pattern of the interference measurement area to which the UE belongs comprises selecting an area scheduling pattern corresponding to a location of the current UE from among the area scheduling pattern of the interference measurement area to which the current UE belongs, according to the location of the current UE. The determining the scheduling adjustment weight values of each UE based on the location of each UE and the area scheduling pattern of the interference measurement area to which the UE belongs comprises determining the scheduling adjustment weight values of the current UE according to an impact factor and the selected area scheduling pattern.

According to an embodiment, the method further comprises counting an average throughput of a current base station according to a third period. The method further comprises adjusting the impact factor, in positive correlation with the average throughput.

According to an embodiment, the method further comprises dynamically predicting high, medium and low interference intensity of each interference measurement area at different time units in a next period based on historical interference information.

According to an embodiment, when scheduling data in a time unit with low interference, the UEs at the edge location are scheduled preferentially by increasing scheduling priorities of the UEs at the edge location.

According to an embodiment, when the scheduling data in the time unit with high interference, the UEs at the central location are scheduled preferentially by increasing scheduling priorities of the UEs at the central location.

According to embodiments, comprises a transceiver, and at least one processor, coupled to the transceiver. The at least one processor configured to predict interference information about interference suffered by a current cell. The at least one processor configured to determine scheduling priorities of respective user equipment (UE) at different time units according to the predicted interference information and locations of the UEs in the current cell. The at least one processor configured to schedule UEs in the current cell according to the determined scheduling priorities.

According to embodiments, an electronic apparatus, comprises at least one processor, and at least one memory storing computer executable instructions. The computer executable instructions, when being executed by the at least one processor, cause the at least one processor to perform a method of predicting interference information about interference suffered by a current cell, determining scheduling priorities of respective user equipment (UE) at different time units according to the predicted interference information and locations of the UEs in the current cell, and scheduling UEs in the current cell according to the determined scheduling priorities.

In embodiments, a method performed by a network node is provided. The method comprises obtaining interference information for a current cell, the interference information for indicating interference levels at time units of a next period in each interference measurement area of a plurality of interference measurement areas of the current cell. The method comprises obtaining scheduling priorities of user equipments (UEs) at the time units of the next period according to the interference information and locations of the UEs in the current cell. The method comprises performing a scheduling of the UEs in the current cell according to the scheduling priorities.

According to an embodiment, each of the interference levels indicates one of a high interference intensity, a medium interference intensity, or a low interference intensity. The interference levels at the time units of the next period are obtained based on an artificial intelligence (AI) model using interference levels at least one previous period in each interference measurement area of the plurality of interference measurement areas of the current cell.

According to an embodiment, the locations of the UEs are divided into a plurality of levels including a cell-edge level and a cell-center level. When scheduling data in a time unit with the low interference intensity, a scheduling priority of a UE at the cell-edge level increases. When scheduling data in a time unit with the high interference intensity, a scheduling priority of a UE at the cell-center level increases.

According to an embodiment, the obtaining of the interference information comprises dividing the current cell into a plurality of unit areas with a current base station as a center. The obtaining of the interference information comprises determining an area interference pattern for each of the plurality of unit areas. The obtaining of the interference information comprises grouping the plurality of unit areas, according to area interference pattern sequence correlations between unit areas of the plurality of unit areas, to determine the plurality of interference measurement areas.

According to an embodiment, the grouping of the plurality of unit areas comprises determining a first unit area as a pending interference measurement area. The grouping of the plurality of unit areas comprises, with respect to the pending interference measurement area, performing an operation of determining the area interference pattern sequence correlation, the operation of determining the area interference pattern sequence correlation being used to determine the area interference pattern sequence correlation between each unit area in the pending interference measurement area and a next unit area adjacent to the pending interference measurement area in a predetermined direction. The grouping of the plurality of unit areas comprises, if a minimum value among the area interference pattern sequence correlations between the next unit area and each unit area in the pending interference measurement area is greater than a first predetermined threshold, grouping the next unit area to the pending interference measurement area, and performing the operation of determining the area interference pattern sequence correlation with respect to the pending interference measurement area at this time. The grouping of the plurality of unit areas comprises, if the minimum value among the area interference pattern sequence correlations between the next unit area and each unit area in the pending interference measurement area is not greater than the first predetermined threshold, determining the pending interference measurement area as a final interference measurement area, determining the next unit area as a new pending interference measurement area, and performing the operation of determining the area interference pattern sequence correlation with respect to the pending interference measurement area at this time.

According to an embodiment, the obtaining of the interference information comprises predicting an area interference pattern of a current interference measurement area at a current second period according to historical interference information of the current interference measurement area, wherein the area interference pattern represents a coding combination of an intensity of an intra-frequency interference of adjacent cells suffered by one area at respective time unit within a predetermined time.

According to an embodiment, the predicting the area interference pattern of the current interference measurement area at the current second period according to the historical interference information of the current interference measurement area comprises determining one interference power matrix of the plurality of interference measurement areas, according to an interference power of each time unit in a previous second period collected at each interference measurement area. The predicting the area interference pattern of the current interference measurement area at the current second period according to the historical interference information of the current interference measurement area comprises selecting one area interference pattern matrix from an area interference pattern table including at least one area interference pattern matrix according to serial numbers of time units within the current second period. The predicting the area interference pattern of the current interference measurement area at the current second period according to the historical interference information of the current interference measurement area comprises predicting the area interference pattern of the current interference measurement area at the current second period according to the interference power matrix and the area interference pattern matrix.

According to an embodiment, the determining the one interference power matrix of the plurality of interference measurement areas, according to the interference power of each time unit in the previous second period collected at each interference measurement area comprises performing the following operations with respect to each interference measurement area by averaging interference powers of time units with a same serial number in a previous second period with respect to the current interference measurement area, obtaining an average interference power of the current interference measurement area at the time units of the previous second period, filtering the average interference power, based on a historical filtered interference power of the current interference measurement area at the time units, to obtain a filtered interference power of the current interference measurement area at the time units of the previous second period, and setting the filtered interference power as the interference power of the current interference measurement area at the time units in the interference power matrix.

According to an embodiment, the historical filtered interference power of the current interference measurement area at the time units is updated as the filtered interference power of the current interference measurement area at the time units of the previous second period.

According to an embodiment, the obtaining of the area interference pattern of the current interference measurement area at the current second period according to the interference power matrix and the area interference pattern matrix comprises determining a result matrix based on the interference power matrix and the area interference pattern matrix. The obtaining of the area interference pattern of the current interference measurement area at the current second period according to the interference power matrix and the area interference pattern matrix comprises determining a maximum value among a plurality of matrix elements corresponding to the current interference measurement area from among the result matrix. The obtaining of the area interference pattern of the current interference measurement area at the current second period according to the interference power matrix and the area interference pattern matrix comprises determining an area interference pattern corresponding to the maximum value in the area interference pattern matrix as the area interference pattern of the current interference measurement area at the current second period.

According to an embodiment, the obtaining of the scheduling priorities comprises determining an area scheduling pattern of each interference measurement area based on the predicted interference information of each interference measurement area, wherein the area scheduling pattern represents a set of weight values for adjusting scheduling priorities of the UEs, at different locations within the current interference measurement area, at different time units. The obtaining of the scheduling priorities comprises determining scheduling adjustment weight values of each UE based on a location of each UE and the area scheduling pattern of an interference measurement area to which the UE belongs. The obtaining of the scheduling priorities comprises adjusting an initial scheduling priority of each UE at each time unit according to the scheduling adjustment weight values of each UE, to obtain the scheduling priorities of the UEs at different time units.

According to an embodiment, the determining the area scheduling pattern of each interference measurement area based on the predicted interference information of each interference measurement area comprises determining an interference mean deviation weight of time units with the same serial number within a current second period, The determining the area scheduling pattern of each interference measurement area based on the predicted interference information of each interference measurement area comprises determining a standard area scheduling pattern of each interference measurement area according to the interference mean deviation weight of the time units with the same serial number and an area interference pattern of each interference measurement area. The determining the area scheduling pattern of each interference measurement area based on the predicted interference information of each interference measurement area comprises determining area scheduling patterns of UEs at different locations in each interference area according to the standard area scheduling pattern of each interference measurement area.

According to an embodiment, the area scheduling patterns of UEs at different locations comprises at least one of an area scheduling pattern of a UE at a central location, an area scheduling pattern of a UE at a middle location, or an area scheduling pattern of a UE at an edge location.

According to an embodiment, the determining the interference mean deviation weight of time units with the same serial number within the current second period comprises determining an average interference power of the time units with the same serial number within the current second period and an average value of interference powers of all time units within the current second period. The determining the interference mean deviation weight of time units with the same serial number within the current second period comprises calculating an absolute difference between the average interference power of the time units with the same serial number and the average value. The determining the interference mean deviation weight of time units with the same serial number within the current second period comprises determining the interference mean deviation weight of the time units with the same serial number according to the absolute difference of the time units with the same serial number.

According to an embodiment, the determining the scheduling adjustment weight values of each UE based on the location of each UE and the area scheduling pattern of the interference measurement area to which the UE belongs comprises selecting an area scheduling pattern corresponding to a location of a current UE from among the area scheduling pattern of the interference measurement area to which the current UE belongs, according to the location of the current UE. The determining the scheduling adjustment weight values of each UE comprises determining the scheduling adjustment weight values of the current UE according to an impact factor and the selected area scheduling pattern.

According to an embodiment, the method comprises counting an average throughput of a current base station according to a third period. The method comprises adjusting the impact factor, in positive correlation with the average throughput.

According to an embodiment, the network node comprises a distributed unit (DU) of a base station. The scheduling of the UEs comprise a proportional fair (PF) scheduling with the scheduling priorities of the UEs.

According to an embodiment, high, medium and low interference intensity of each interference measurement area at the time units in the next period is obtained based on historical interference information. When scheduling data in a time unit with low interference, the UEs at the edge location are scheduled preferentially by increasing scheduling priorities of the UEs at the edge location. When the scheduling data in the time unit with high interference, the UEs at the central location are scheduled preferentially by increasing scheduling priorities of the UEs at the central location.

In embodiments, a network node, comprises a transceiver, and at least one processor, coupled to the transceiver. The at least one processor configured to obtain interference information for a current cell, the interference information for indicating interference levels at time units of a next period in each interference measurement area of a plurality of interference measurement areas of the current cell. The at least one processor configured to obtain scheduling priorities of user equipments (UEs) at the time units of the next period according to the interference information and locations of the UEs in the current cell. The at least one processor configured to perform a scheduling of the UEs in the current cell according to the scheduling priorities.

In embodiments, an electronic apparatus, comprises at least one processor, and at least one memory storing computer executable instructions. The computer executable instructions, when being executed by the at least one processor, cause the at least one processor to perform a method of obtaining interference information for a current cell, the interference information for indicating interference levels at time units of a next period in each interference measurement area of a plurality of interference measurement areas of the current cell, obtaining scheduling priorities of user equipments (UEs) at the time units of the next period according to the interference information and locations of the UEs in the current cell, and performing a scheduling of the UEs in the current cell according to the scheduling priorities.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

As an example, the electronic apparatus may be a PC computer, a tablet device, a personal digital assistant, a smart phone, or other devices capable of executing the above set of instructions. The electronic apparatus does not have to be a single electronic apparatus and may also be any device or a collection of circuits that may execute the above instructions (or instruction sets) individually or jointly. The electronic apparatus may also be a part of an integrated control system or a system manager, or may be configured as a portable electronic apparatus interconnected by an interface with a local or remote (e.g., via wireless transmission).

In the electronic apparatus, the processor may include a Central Processing Unit (CPU), a Graphics Processing Unit (GPU), a programmable logic device, a specialized processor system, a microcontroller, or a microprocessor. By way of example and not limitation, the processor may further include an analog processor, a digital processor, a microprocessor, a multicore processor, a processor array, a network processor, and the like.

The processor may execute instructions or codes stored in the memory, where the memory may further store data. Instructions and data may further be transmitted and received through a network via a network interface device, wherein the network interface device may use any known transmission protocol.

The memory may be integrated with the processor as a whole, for example, RAM or a flash memory is arranged in an integrated circuit microprocessor or the like. In addition, the memory may include an independent device, such as an external disk drive, a storage array, or other storage device that may be used by any database system. The memory and the processor may be operatively coupled, or may communicate with each other, for example, through an input/output (I/O) port, a network connection, or the like, so that the processor may read files stored in the memory.

In addition, the electronic apparatus may further include a video display (such as a liquid crystal display) and a user interaction interface (such as a keyboard, a mouse, a touch input device, etc.). All components of the electronic apparatus may be connected to each other via a bus and/or a network.

According to an embodiment of the disclosure, there may further be provided a computer-readable storage medium storing instructions, wherein the instructions, when being executed by at least one processor, cause the at least one processor to execute the above method performed by the network node according to the embodiment of the disclosure. Examples of the computer-readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, compact disc-ROM (CD-ROM), CD-R, CD+R, CD-RW, CD+RW, digital versatile disc-ROM (DVD-ROM), DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The instructions and the computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

It should be noted that the terms "first", "second", "third", "fourth", "1", "2" and the like (if exists) in the description and claims of the disclosure and the above drawings are used to distinguish similar objects, and need not be used to describe a specific order or sequence. It should be understood that data used as such may be interchanged in appropriate situations, so that the embodiments of the disclosure described here may be implemented in an order other than the illustration or text description.

It should be understood that although each operation step is indicated by arrows in the flowcharts of the embodiments of the disclosure, an implementation order of these steps is not limited to an order indicated by the arrows. Unless explicitly stated herein, in some implementation scenarios of the embodiments of the disclosure, the implementation steps in the flowcharts may be executed in other orders according to requirements. In addition, some or all of the steps in each flowchart may include a plurality of sub steps or stages, based on an actual implementation scenario. Some or all of these sub steps or stages may be executed at the same time, and each sub step or stage in these sub steps or stages may also be executed at different times. In scenarios with different execution times, an execution order of these sub steps or stages may be flexibly configured according to requirements, which is not limited by the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network node, the method comprising:

obtaining interference information for a current cell, the interference information for indicating interference levels at time units of a next period in each interference measurement area of a plurality of interference measurement areas of the current cell;

determining an area scheduling pattern of an interference measurement area among the plurality of interference measurement areas based on the interference information, wherein the area scheduling pattern comprises weight values for adjusting scheduling priorities of user equipments (UEs) at different locations within the interference measurement area and at different time units;

obtaining the scheduling priorities of the UEs at the time units by adjusting an initial scheduling priority of each UE in accordance with the weight values; and scheduling the time units of the next period for the UEs in the current cell in accordance with the scheduling priorities.

2. The method according to claim 1, wherein the scheduling priorities are determined based on interference levels at the time units of the next period and locations of the UEs in the interference measurement area, wherein each of the interference levels indicates one of a high interference intensity, a medium interference intensity, or a low interference intensity, and wherein the interference levels at the time units of the next period are obtained based on an artificial intelligence (AI) model using interference levels at least one previous period in each interference measurement area of the plurality of interference measurement areas of the current cell.

3. The method according to claim 2, wherein the locations of the UEs are divided into a plurality of levels including a cell-edge level and a cell-center level, wherein, based on scheduling data in a time unit with the low interference intensity, a scheduling priority of a UE at the cell-edge level increases, and wherein, based on scheduling data in a time unit with the high interference intensity, a scheduling priority of a UE at the cell-center level increases.

4. The method according to claim 1, wherein the obtaining of the interference information comprises:

dividing the current cell into a plurality of unit areas with a current base station as a center;

determining an area interference pattern for each of the plurality of unit areas; and grouping the plurality of unit areas, in accordance with area interference pattern sequence correlations between unit areas of the plurality of unit areas, to determine the plurality of interference measurement areas.

5. The method according to claim 4, wherein the grouping of the plurality of unit areas comprises:

determining a first unit area as a pending interference measurement area;

with respect to the pending interference measurement area, performing an operation of determining the area interference pattern sequence correlation, the operation of determining the area interference pattern sequence correlation being used to determine the area interference pattern sequence correlation between each unit area in the pending interference measurement area and a next unit area adjacent to the pending interference measurement area in a predetermined direction;

if a minimum value among the area interference pattern sequence correlations between the next unit area and each unit area in the pending interference measurement area is greater than a first predetermined threshold, grouping the next unit area to the pending interference measurement area, and performing the operation of determining the area interference pattern sequence correlation with respect to the pending interference measurement area at this time; and if the minimum value among the area interference pattern sequence correlations between the next unit area and each unit area in the pending interference measurement area is not greater than the first predetermined threshold, determining the pending interference measurement area as a final interference measurement area, determining the next unit area as a new pending interference measurement area, and performing the operation of determining the area interference pattern sequence correlation with respect to the pending interference measurement area at this time.

6. The method according to claim 1, wherein the obtaining of the interference information comprises:

predicting an area interference pattern of a current interference measurement area at a current second period in accordance with historical interference information of the current interference measurement area, wherein the area interference pattern represents a coding combination of an intensity of an intra-frequency interference of adjacent cells suffered by one area at respective time unit within a predetermined time.

7. The method according to claim 6, wherein the predicting the area interference pattern of the current interference measurement area at the current second period in accordance with the historical interference information of the current interference measurement area comprises:

determining one interference power matrix of the plurality of interference measurement areas, in accordance with an interference power of each time unit in a previous second period collected at each interference measurement area;

selecting one area interference pattern matrix from an area interference pattern table including at least one area interference pattern matrix in accordance with serial numbers of time units within the current second period; and predicting the area interference pattern of the current interference measurement area at the current second period in accordance with the interference power matrix and the area interference pattern matrix.

8. The method according to claim 7, wherein the determining the one interference power matrix of the plurality of interference measurement areas, in accordance with the interference power of each time unit in the previous second period collected at each interference measurement area comprises:

performing the following operations with respect to each interference measurement area:

by averaging interference powers of time units with a same serial number in a previous second period with respect to the current interference measurement area, obtaining an average interference power of the current interference measurement area at the time units of the previous second period;

filtering the average interference power, based on a historical filtered interference power of the current interference measurement area at the time units, to obtain a filtered interference power of the current interference measurement area at the time units of the previous second period; and setting the filtered interference power as the interference power of the current interference measurement area at the time units in the interference power matrix.

9. The method according to claim 8, wherein the historical filtered interference power of the current interference measurement area at the time units is updated as the filtered interference power of the current interference measurement area at the time units of the previous second period.

10. The method according to claim 7, wherein the obtaining of the area interference pattern of the current interference measurement area at the current second period in accordance with the interference power matrix and the area interference pattern matrix comprises:

determining a result matrix based on the interference power matrix and the area interference pattern matrix;

determining a maximum value among a plurality of matrix elements corresponding to the current interference measurement area from among the result matrix; and determining an area interference pattern corresponding to the maximum value in the area interference pattern matrix as the area interference pattern of the current interference measurement area at the current second period.

11. The method according to claim 1, wherein the determining the area scheduling pattern of each interference measurement area based on the interference information of each interference measurement area comprises:

determining an interference mean deviation weight of time units with a same serial number within a current second period;

determining a standard area scheduling pattern of each interference measurement area in accordance with the interference mean deviation weight of the time units with the same serial number and an area interference pattern of each interference measurement area; and determining area scheduling patterns of UEs at different locations in each interference area in accordance with the standard area scheduling pattern of each interference measurement area.

12. The method according to claim 11, wherein the area scheduling patterns of UEs at different locations comprises at least one of:

an area scheduling pattern of a UE at a central location, an area scheduling pattern of a UE at a middle location, or an area scheduling pattern of a UE at an edge location.

13. The method according to claim 11, wherein the determining the interference mean deviation weight of time units with the same serial number within the current second period comprises:

determining an average interference power of the time units with the same serial number within the current second period and an average value of interference powers of all time units within the current second period;

calculating an absolute difference between the average interference power of the time units with the same serial number and the average value; and determining the interference mean deviation weight of the time units with the same serial number in accordance with the absolute difference of the time units with the same serial number.

14. The method according to claim 1, wherein the determining the area scheduling pattern of the interference measurement area comprises:

selecting an area scheduling pattern corresponding to a location of a current UE from among the area scheduling pattern of the interference measurement area to which the current UE belongs, in accordance with the location of the current UE; and determining weight values of the current UE in accordance with an impact factor and the selected area scheduling pattern.

15. The method according to claim 14, further comprising:

counting an average throughput of a current base station in accordance with a third period; and adjusting the impact factor, in positive correlation with the average throughput.

16. The method according to claim 1, wherein the network node comprises a distributed unit (DU) of a base station, and wherein the scheduling of the UEs comprises a proportional fair (PF) scheduling with the scheduling priorities of the UEs.

17. The method according to claim 1, wherein high, medium and low interference intensity of each interference measurement area at the time units in the next period is obtained based on historical interference information, wherein, based on scheduling data in a time unit with low interference intensity, at least one UE at an edge location are scheduled by increasing scheduling priorities of the at least one UE at the edge location, and wherein, based on scheduling data in the time unit with high interference intensity, at least one UE at a central location are scheduled preferentially by increasing scheduling priorities of the at least one UE at the central location.

18. A network node, comprising:

a transceiver; and at least one processor comprising processing circuitry and coupled to the transceiver, wherein the at least one processor configured to:

obtain interference information for a current cell, the interference information for indicating interference levels at time units of a next period in each interference measurement area of a plurality of interference measurement areas of the current cell, determine an area scheduling pattern of an interference measurement area among the plurality of interference measurement areas based on the interference information, wherein the area scheduling pattern comprises weight values for adjusting scheduling priorities of user equipments (UEs) at different locations within the interference measurement area and at different time units, obtain the scheduling priorities of the UEs at the time units by adjusting an initial scheduling priority of each UE in accordance with the weight values, and schedule the time units of the next period for the UEs in the current cell in accordance with the scheduling priorities.

19. An electronic apparatus, comprising:

at least one processor; and at least one memory storing computer executable instructions, wherein the computer executable instructions, when executed by the at least one processor, cause the electronic apparatus to:

obtain interference information for a current cell, the interference information for indicating interference levels at time units of a next period in each interference measurement area of a plurality of interference measurement areas of the current cell, determine an area scheduling pattern of an interference measurement area among the plurality of interference measurement areas based on the interference information, wherein the area scheduling pattern comprises weight values for adjusting scheduling priorities of user equipments (UEs) at different locations within the interference measurement area and at different time units, obtain the scheduling priorities of the UEs at the time units by adjusting an initial scheduling priority of each UE in accordance with the weight values, and schedule the time units of the next period for the UEs in the current cell in accordance with the scheduling priorities.

* * * * *